(12) United States Patent
Liao et al.

(10) Patent No.: US 10,427,833 B2
(45) Date of Patent: *Oct. 1, 2019

(54) ASSEMBLABLE PALLET

(71) Applicants: AIR-BAG PACKING CO., LTD., New Taipei (TW); Tai-An Liao, New Taipei (TW)

(72) Inventors: Yaw-Shin Liao, New Taipei (TW); Kao-Hsiung Liao, New Taipei (TW); Chieh-Hua Liao, New Taipei (TW)

(73) Assignees: AIR-BAG PACKING CO., LTD., New Taipei (TW); Tai-An Liao, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/533,041

(22) PCT Filed: Jan. 16, 2015

(86) PCT No.: PCT/CN2015/070912
§ 371 (c)(1),
(2) Date: Jun. 5, 2017

(87) PCT Pub. No.: WO2016/090731
PCT Pub. Date: Jun. 16, 2016

(65) Prior Publication Data
US 2017/0327269 A1 Nov. 16, 2017

(30) Foreign Application Priority Data
Dec. 9, 2014 (CN) .......................... 2014 1 0747798

(51) Int. Cl.
*B65D 19/00* (2006.01)
*B29C 33/42* (2006.01)
(Continued)

(52) U.S. Cl.
CPC .......... *B65D 19/0028* (2013.01); *B29C 33/42* (2013.01); *B65D 19/0097* (2013.01);
(Continued)

(58) Field of Classification Search
CPC ............ B65D 19/0028; B65D 19/0036; B65D 19/004; B65D 19/0042; B65D 19/0051; B65D 2519/00547; B65D 2519/00532
(Continued)

(56) References Cited

U.S. PATENT DOCUMENTS 4,230,050 A * 10/1980 Mays ................. B65D 19/0095
108/57.17
5,413,052 A * 5/1995 Breezer .............. B65D 19/0012
108/56.1
(Continued)

*Primary Examiner* — Jose V Chen
(74) *Attorney, Agent, or Firm* — Idea Intellectual Limited; Margaret A. Burke; Sam T. Yip

(57) ABSTRACT

A pallet includes base members, connecting bars, and a loading plate. The connecting bars secure the base members to form a pallet frame. The loading plate is fixed on the pallet frame. The size of the pallet can be adjusted in length and width so as to be adjusted freely and conveniently according to practical requirements. Consequently, the cost for manufacturing the pallet can be reduced. In addition, when one base member is damaged or missing, the damaged or missing base member can be replaced by a new base member. Therefore, the pallet can be used for more times, allowing the cost reduction in manufactory. Furthermore, the base members and the connecting bars are connected with each other to form the pallet frame which is rigid and has high structural strength, such that the pallet frame would not deform and is safe when used for handling and transporting materials.

11 Claims, 21 Drawing Sheets

(51) Int. Cl.
    *B65D 19/06*     (2006.01)
    *B29L 31/00*     (2006.01)
(52) U.S. Cl.
    CPC ...... *B65D 19/06* (2013.01); *B29L 2031/7178* (2013.01); *B65D 2519/00019* (2013.01); *B65D 2519/00034* (2013.01); *B65D 2519/00069* (2013.01); *B65D 2519/00273* (2013.01); *B65D 2519/00293* (2013.01); *B65D 2519/00303* (2013.01); *B65D 2519/00323* (2013.01); *B65D 2519/00338* (2013.01); *B65D 2519/00383* (2013.01); *B65D 2519/00512* (2013.01); *B65D 2519/00562* (2013.01); *B65D 2519/00567* (2013.01)
(58) Field of Classification Search
    USPC .................................. 108/51.11, 56.1, 57.25
    See application file for complete search history.

(56)              References Cited

U.S. PATENT DOCUMENTS

| 5,544,374 | A  | * | 8/1996  | Strobel      | A47C 19/024  |
|           |    |   |         |              | 108/159      |
| 5,687,653 | A  | * | 11/1997 | Bumgarner    | B65D 19/0091 |
|           |    |   |         |              | 108/56.3     |
| 6,105,512 | A  | * | 8/2000  | Lin          | B65D 19/0073 |
|           |    |   |         |              | 108/55.5     |
| 8,522,694 | B2 | * | 9/2013  | Linares      | B65D 19/0026 |
|           |    |   |         |              | 108/51.11    |
| 8,701,569 | B2 | * | 4/2014  | Linares      | B65D 19/0026 |
|           |    |   |         |              | 108/51.3     |
| 9,139,334 | B2 | * | 9/2015  | Wahl         | B65D 19/0016 |
| 9,511,897 | B2 | * | 12/2016 | Liao         | B65D 19/0095 |
| 9,511,898 | B2 | * | 12/2016 | Liao         | B65D 19/0097 |
| 9,669,962 | B2 | * | 6/2017  | Liao         | B65D 19/0097 |
| 2004/0218276 | A1 | * | 11/2004 | Apps      | B65D 19/0012 |
|           |    |   |         |              | 359/582      |
| 2006/0102055 | A1 | * | 5/2006  | Wu        | B65D 19/0028 |
|           |    |   |         |              | 108/51.3     |
| 2006/0201402 | A1 | * | 9/2006  | Moore, Jr. | B65D 19/0012 |
|           |    |   |         |              | 108/57.25    |
| 2008/0210140 | A1 | * | 9/2008  | Valentinsson | B65D 19/0014 |
|           |    |   |         |              | 108/57.25    |
| 2008/0295748 | A1 | * | 12/2008 | Yoshida   | B65D 19/0026 |
|           |    |   |         |              | 108/55.1     |
| 2012/0291678 | A1 | * | 11/2012 | Howland   | B65D 19/0018 |
|           |    |   |         |              | 108/53.3     |

* cited by examiner

ASSEMBLABLE PALLET

CROSS REFERENCE OF RELATED APPLICATION

The present application is a national phase application of the international patent application PCT/CN2015/070912 filed on Jan. 16, 2015, which claims priority from CN201410747798.6 filed on Dec. 9, 2014, and the disclosures of which are incorporated herein by reference in their entirety.

FIELD OF THE INVENTION

The instant disclosure relates to technical field of loading, in particular, to a pallet.

BACKGROUND

As known, conventional plastic pallets are integrally formed. To manufacture plastic pallets with different sizes, molds with different sizes have to be used. However, the molds are quite expensive. In addition, the conventional plastic pallet might be useless when being damaged, even if only a small piece of the pallet is missing.

SUMMARY OF INVENTION

How to manufacture a pallet with low cost and high usage rate is an issue for related personnel.

To address these issues, one embodiment of the instant disclosure provides a pallet. The pallet comprises a plurality of first base members, a plurality of second base members, a central base member, a plurality of connecting bars, and a loading plate. Each of the first base members comprises a first base body and a plurality of first fixing grooves formed on the first base body. One end of each first fixing groove is in communication with one end of one another first fixing groove, and the first fixing grooves of each of the first base members are oriented orthogonally. Each of the second base members is located between the corresponding two first base members. Each of the second base members comprises a second base body, a second fixing groove formed on the second base body, and a second slot formed on the second base body, wherein one end of the second fixing groove is in communication with the second slot, and the second fixing groove and the second slot are oriented orthogonally. The central base member is located between the second base members. The central base member comprises a central base body and a plurality of central slots, wherein the central slots are formed on the central base body and intersected at an intersecting point of the central base body. The connecting bars are fixedly received in the first fixing grooves, the second fixing grooves, the second slots, and the central slots to secure the central base member, the first base members, and the second base members to form a pallet frame. Two ends of each of the connecting bars are respectively abutted against respective inner walls of the first fixing grooves or respective inner walls of the second fixing grooves, so that the connecting bars are positionally restricted by the first fixing grooves, the second fixing grooves, and the central slots. The loading plate is fixed on the pallet frame.

Wherein, the central base member further comprises a plurality of central angled slots formed on the central base body. The central slots and the central angled slots cross at the intersecting point of the central base body.

Wherein, each of the first base members comprises a first angled fixing groove formed on the first base body, and one end of the first angled fixing groove is in communication with one end of each of the first fixing grooves.

Wherein, the central base member further comprises a plurality of central angled slots formed on the central base body. Each of the central angled slots comprises, along a direction toward the intersecting point of the central base body, a central exterior expanding section, a central abutting portion, and a central interior expanding section.

Wherein, each of the first base members further comprises a first angled fixing grove. The first angled fixing groove of each of the first base members comprises, along a direction toward a connection between the first fixing grooves of the first base member, a first exterior expanding section, a first abutting portion, and a first interior expanding section.

Wherein, the pallet further comprises a plurality of slanted connecting bars fixedly received in the first angled fixing grooves and the central angled slots to secure the central base member and the first base members. The slanted connecting bars are positionally restricted by the first angled fixing grooves and the central angled slots.

Wherein, the central base member further comprises a plurality of central positioning holes and each of the first base members further comprises a plurality of first positioning holes.

Wherein, each of the connecting bars and the slanted connecting bars comprise a main body and a plurality of bending portions. The bending portions extend from respective opposite ends of the main body and bent toward the same direction. The bending portions are inserted into the corresponding central positioning holes and the corresponding first positioning holes to secure the central base member and the first base members.

Wherein, the central positioning holes are formed in the central slots and the central angled slots, and the depth of each of the central positioning holes is greater than the depth of the corresponding central slot and the depth of the corresponding central angled slot. The first positioning holes are formed in the first fixing grooves and the first angled fixing groove of each of the first base members, and the depth of each of the first positioning holes is greater than the depth of the corresponding first fixing groove and the depth of the corresponding first angled fixing groove.

Wherein, the central base member further comprises a plurality of central positioning holes, each of the first base members further comprises a plurality of first positioning holes, and each of the second base members further comprises a plurality of second positioning holes.

Wherein, each of the connecting bars comprises a main body and a plurality of bending portions extending from respective opposite ends of the main body and bent toward the same direction. The bending portions are inserted into the corresponding central positioning holes, the corresponding first positioning holes, and the corresponding second positioning holes to secure the central base member, the first base members, and the second base members.

Wherein, the central positioning holes are formed in the respective central slots, and the depth of each of the central positioning holes is greater than the depth of the corresponding central slot. The first positioning holes are formed in the first fixing grooves of each of the first base members, and the depth of each of the first positioning holes is greater than the depth of the first fixing groove. The second positioning holes are formed in the second fixing groove of each of the second base members, and the depth of each of the second positioning holes is greater than the depth of the second fixing groove.

Wherein, the loading plate is fixed on the pallet frame by means of gluing, heat sealing or locking.

Wherein, each of the first base members comprises a limiting surface formed at the connection between the first fixing grooves for restricting the connecting bars.

Wherein, when the pallet frame is assembled, each of the central angled slots is aligned with the corresponding first angled fixing groove.

Wherein, each of the connecting bars comprises a recess. When two of the connecting bars are in a cross-stacked relationship, the recess of one of the connecting bars is mated with the other connecting bar.

Wherein, each of the connecting bars comprises a recess. The recess of one of the connecting bars is mated with the other connecting bar when two of the connecting bars are in a cross-stacked relationship. Conversely, the recess of one of the connecting bars is mated with one slanted connecting bar when the connecting bar and the slanted connecting bar are in a cross-stacked relationship. Each of the slanted connecting bars comprises a recess. The recess of one of the slanted connecting bars is mated with the other slanted connecting bar when two of the slanted connecting bars are in a cross-stacked relationship. Conversely, the recess of one of the slanted connecting bars is mated with one connecting bar when the slanted connecting bar and the connecting bar are in a cross-stacked relationship.

The advantages of the pallet according to the instant disclosure are described as below. In the aforementioned embodiments, the pallet may comprise the central base member, the first base members, the second base members, the connecting bars, and the loading plate. The size of the pallet can be adjusted in its length and width. Therefore, the size of the pallet can be adjusted freely and conveniently according to practical requirements. Consequently, the cost for manufacturing the pallet can be reduced. Furthermore, two ends of each of the connecting bars are abutted against the inner walls of the corresponding first fixing groove or the inner walls of the corresponding second fixing groove, such that the connecting bars can be prevented from moving freely relative to the fixing grooves or falling off the base members. In addition, when one of the base members of the pallet is damaged or missing, the damaged base member or the missing base member can be replaced by a new base member. Therefore, the pallet can be used twice or for more times, allowing the cost reduction in manufactory. Furthermore, the base members and the connecting bars are connected with each other to form the pallet frame which is rigid and has high structural strength, such that the pallet frame would not deform and is safe when used for handling and transporting materials.

DETAILED DESCRIPTION

Figure 1:
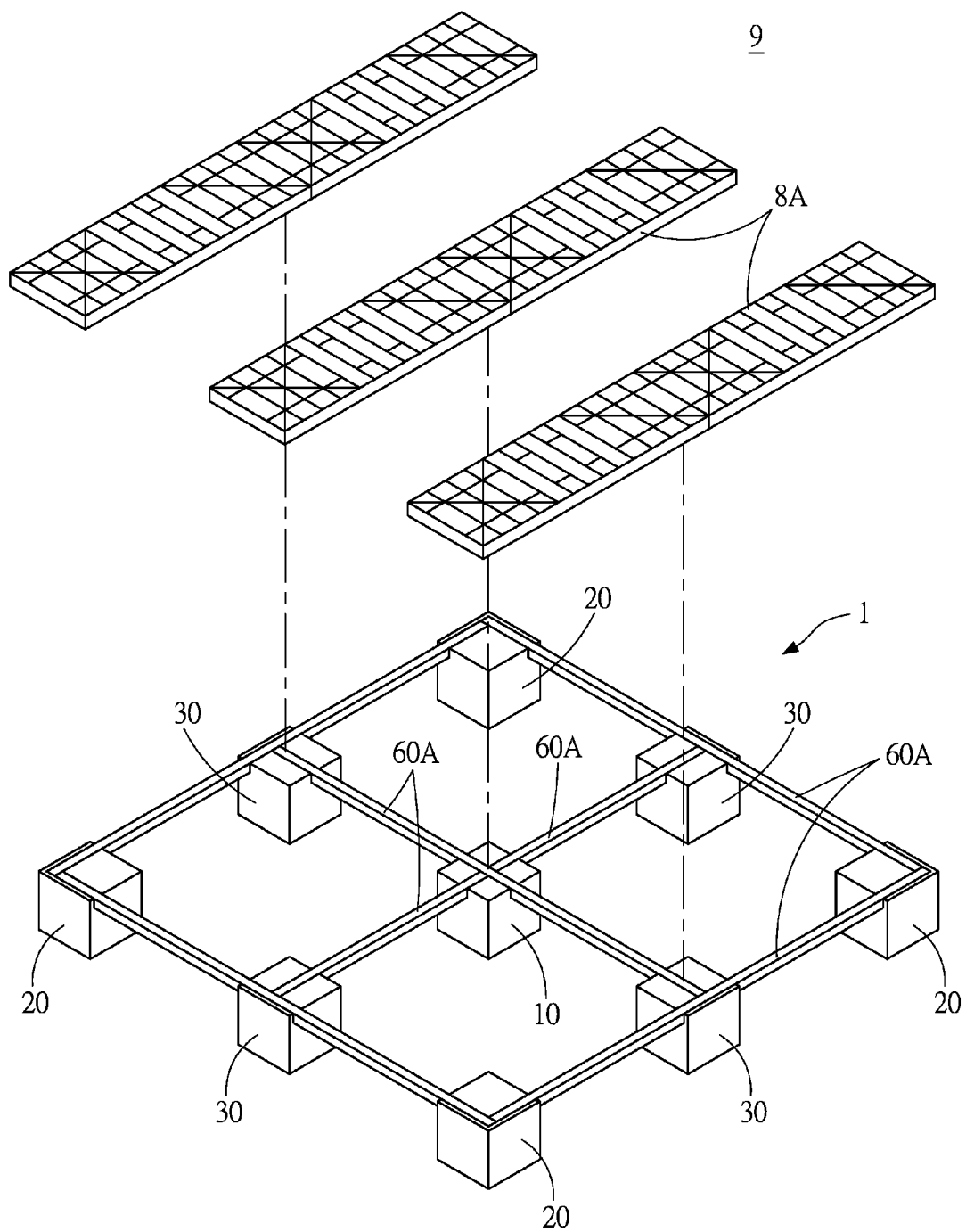
FIG. 1 illustrates a structural schematic view (1) of a pallet of an embodiment according to the instant disclosure.

The following descriptions are accompanied with drawings and embodiments to clearly show the problems to be solved, the technical solutions, and the advantages of the instant disclosure.

In view of the conventional pallet which has high manufacturing cost, high usage cost, and low usage rate, a pallet 9, as shown in FIGS. 1 to 7, is provided. The pallet 9 comprises a plurality of first base members 20, a plurality of second base members 30, a central base member 10, a plurality of connecting bars 60A, and a loading plate 8A. Each of the first base members 20 comprises a first base body 23 and a plurality of first fixing grooves 21 formed on the first base body 23. One end of each first fixing groove 21 is in communication with one end of one another first fixing groove 21, and the first fixing grooves 21 of each of the first base members 20 are oriented orthogonally. Each of the second base members 30 is located between the corresponding two first base members 20. Each of the second base members 30 comprises a second base body 33, a second fixing groove 31 formed on the second base body 33, and a second slot 32 formed on the second base body 33. One end of the second fixing groove 31 is in communication with the second slot 32, and the second fixing groove 31 and the second slot 32 are oriented orthogonally. The central base member 10 is located between the second base members 10, and the central base member 10 comprises a central base body 13 and a plurality of central slots 11. The central slots 11 are formed on the central base body 13 and intersected at an intersecting point 10A of the central base body 13. The connecting bars 60A are fixedly received in the first fixing grooves 21, the second fixing grooves 31, the second slots 32, and the central slots 11 to secure the central base member 10, the first base members 20, and the second base members 30 to form a pallet frame 1. Two ends of each of the connecting bars 60A are respectively abutted against respective inner walls of the first fixing grooves 21 or respective inner walls of the second fixing grooves 31, so that the connecting bars 60A are positionally restricted by the first fixing grooves 21, the second fixing grooves 31, and the central slots 11. The loading plate 8 is fixed on the pallet frame 1.

The advantages of the pallet according to the instant disclosure are described as below. In the aforementioned embodiments, the pallet may comprise the central base member, the first base members, the second base members, the connecting bars, and the loading plate. The size of the pallet can be adjusted in its length and width. Therefore, the size of the pallet can be adjusted freely and conveniently according to practical requirements. Consequently, the cost for manufacturing the cost can be reduced. Furthermore, two ends of each of the connecting bars are abutted against the inner walls of the corresponding first fixing groove or the inner walls of the corresponding second fixing groove, such that the connecting bars can be prevented from moving freely relative to the fixing grooves or falling off the base members. In addition, when one of the base members of the pallet is damaged or missing, the damaged base member or the missing base member can be replaced by a new base member. Therefore, the pallet can be used twice or for more times, allowing the cost reduction in manufactory. Furthermore, the base members and the connecting bars are connected with each other to form the pallet frame which is rigid and has high structural strength, such that the pallet frame would not deform and is safe when used for handling and transporting materials.

Wherein, each of the first base members comprises a limiting surface formed at the connection between the first fixing grooves for restricting the connecting bars.

Figure 2:
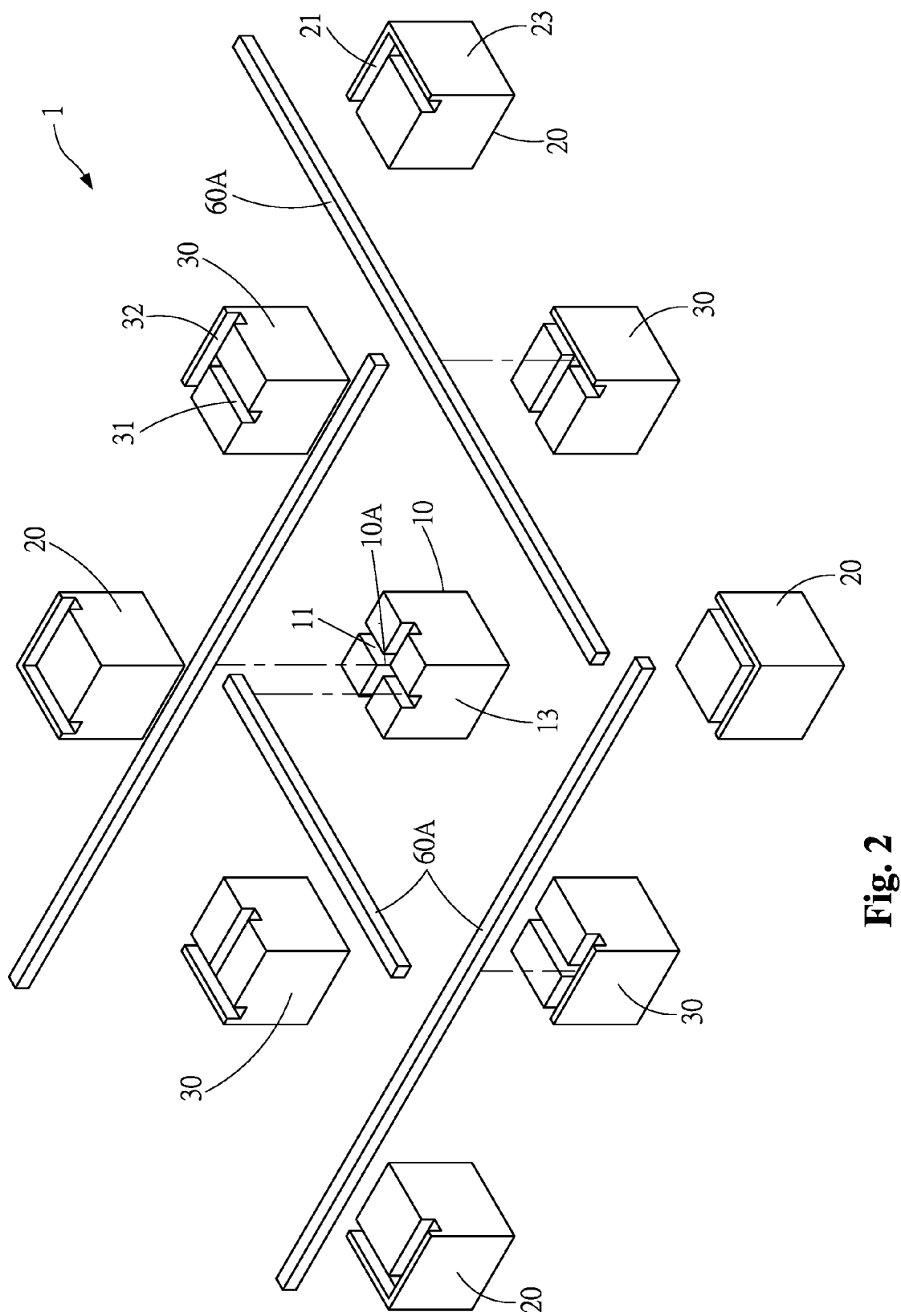
FIG. 2 illustrates a structural schematic view (1) of a pallet frame of the embodiment according to the instant disclosure.
Figure 4:
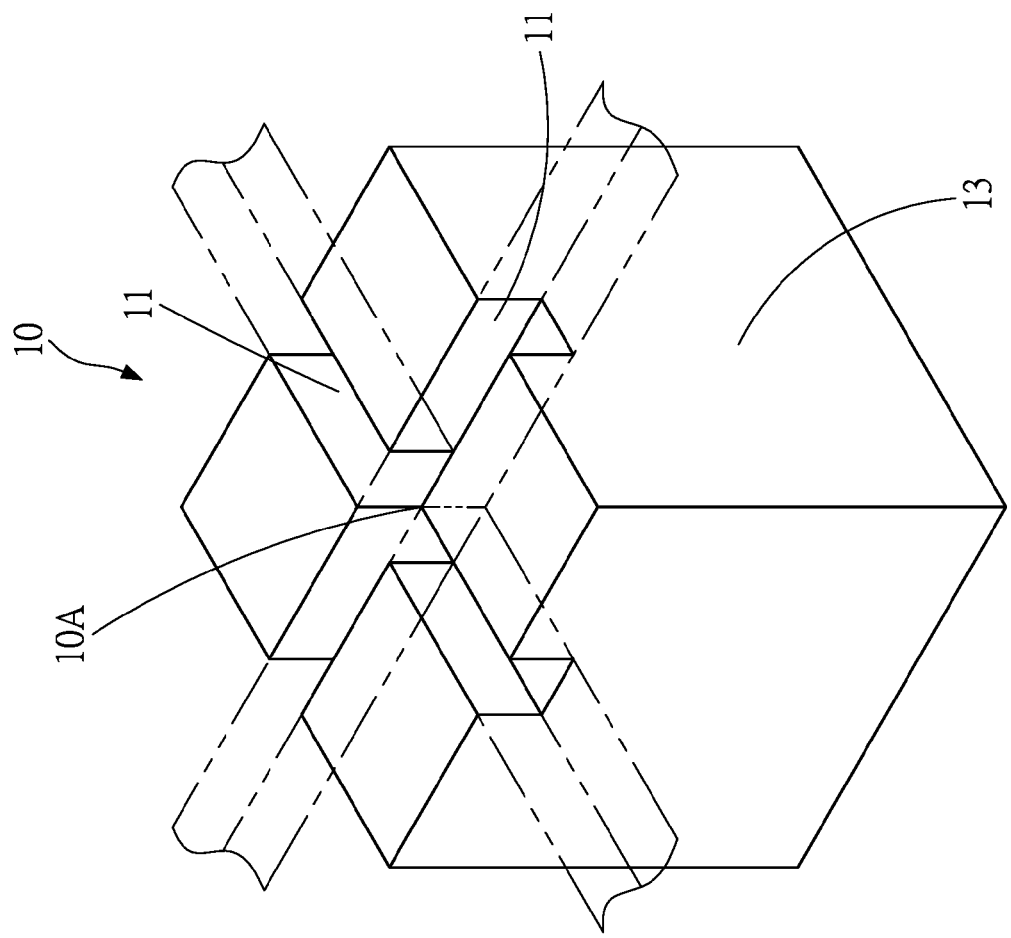
FIG. 4 illustrates a structural schematic view (1) of a central base member of the embodiment according to the instant disclosure.

Furthermore, please refer to FIGS. 2 and 4. The central base member 10 is manufactured by plastic extrusion molding. The central base member 10 comprises a central base body 13 and a plurality of central slots 11. The central slots 11 are formed on the central base body 13 and intersected at an intersecting point 10A of the central base body 13. In this embodiment, the central base body 13 is a polyhedron (as shown in FIG. 4), but embodiments are not limited thereto. In some embodiments, the central base body 13 may be rounded. The central slots 11 are formed at one of the surfaces of the central base body 13. In addition, each of the central slots 11 is oriented orthogonally to the adjacent central slots 11. In general, the central slots 11 are arranged in a cross-like pattern.

Figure 3:
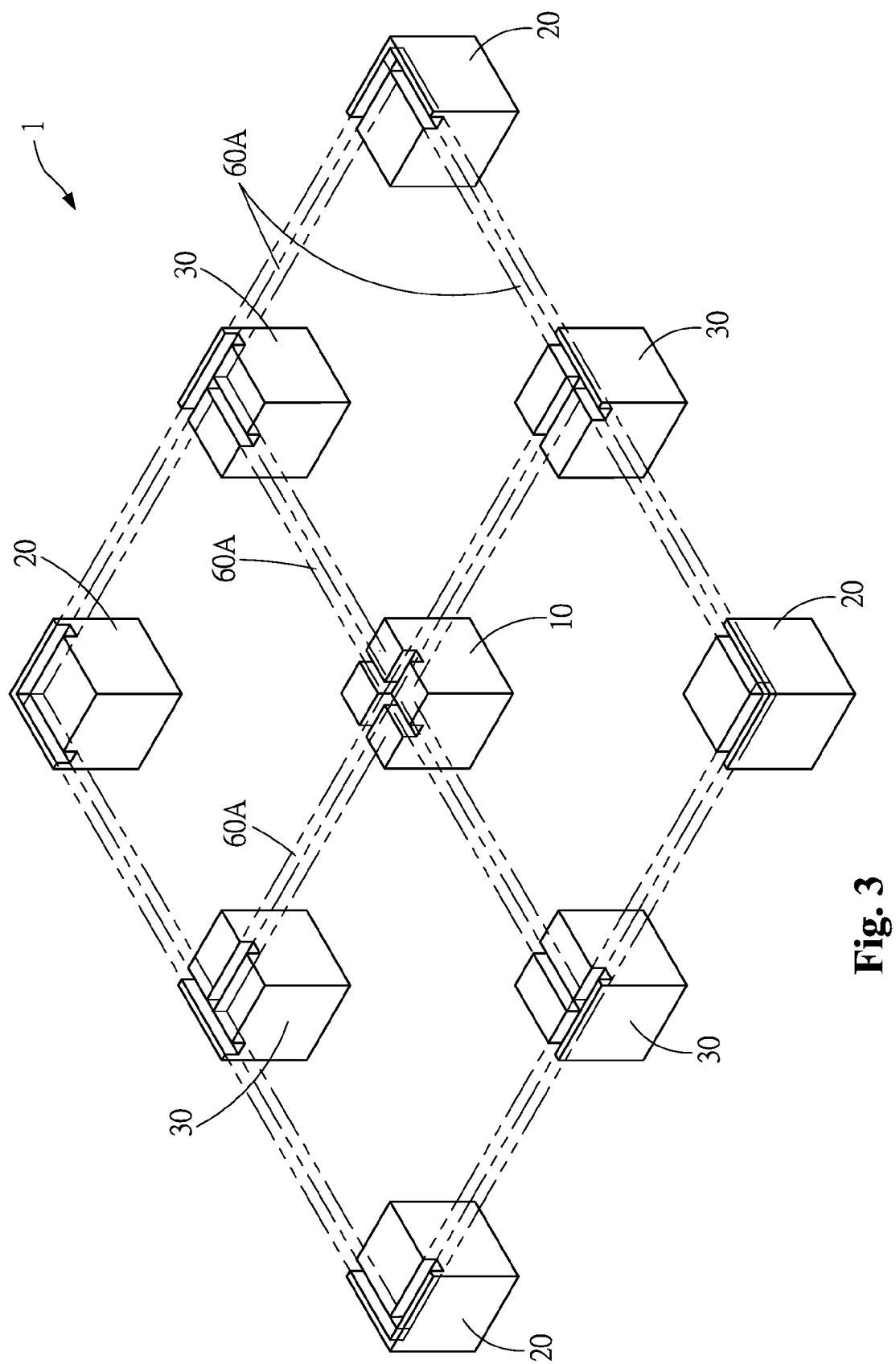
FIG. 3 illustrates a structural schematic view (2) of the pallet frame of the embodiment according to the instant disclosure.
Figure 5:
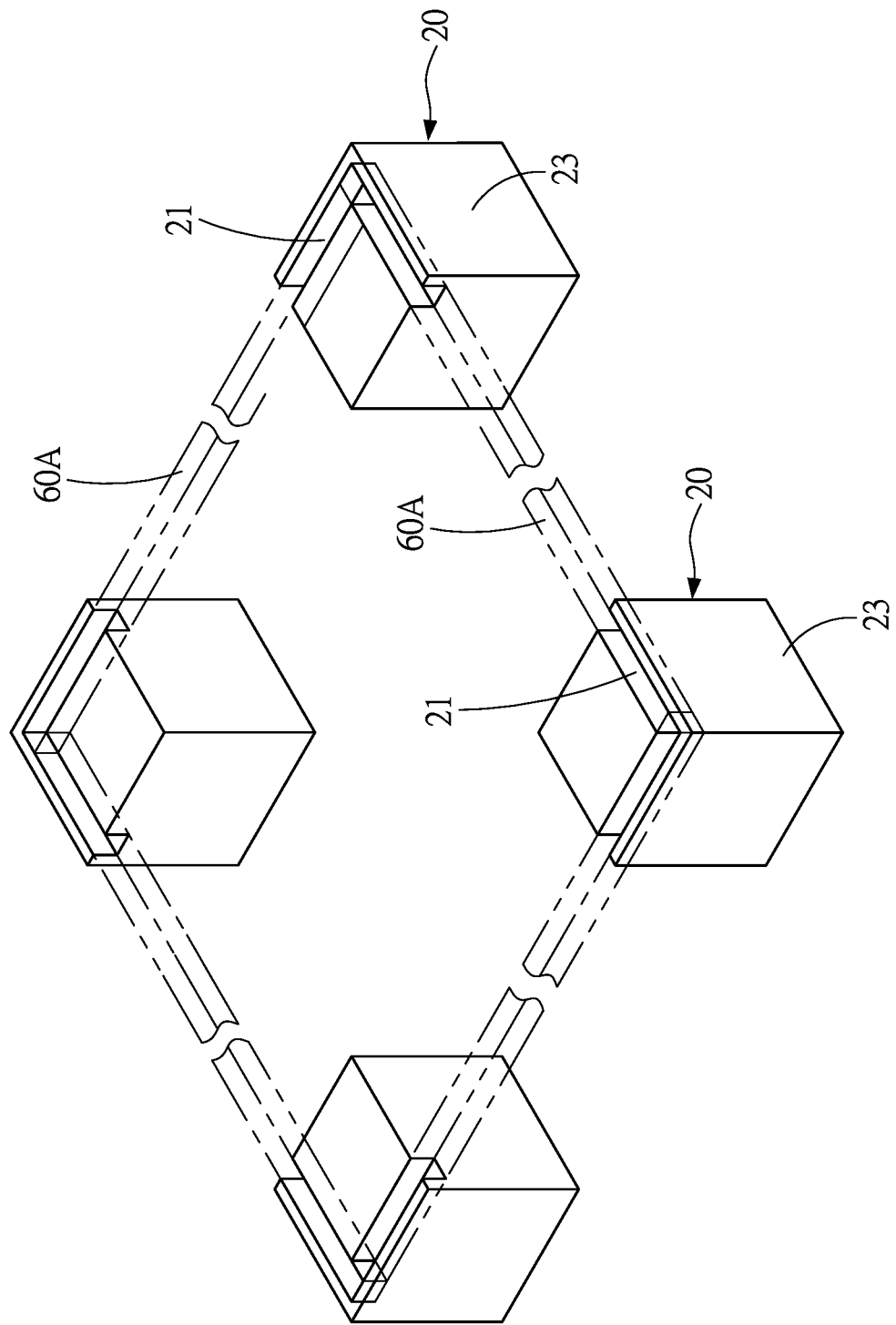
FIG. 5 illustrates a structural schematic view (1) of a first base member of the embodiment according to the instant disclosure.

Please refer to FIG. 2, FIG. 3, and FIG. 5. The first base members 20 are arranged symmetrically about the central base member 10. The first base members 20 are manufactured by plastic extrusion molding. Each of the first base members 20 comprises a first base body 23 and a plurality of first fixing grooves 21. The first fixing grooves 21 are formed on the first base body 23. One end of each first fixing groove 21 is in communication with one end of one another first fixing groove 21, and the first fixing grooves 21 of each of the first base members 20 are oriented orthogonally.

Please refer to FIG. 5. Here, each of the first fixing grooves 21 defines an "open" end and an opposite "closed" end. The "open" end communicates longitudinally with a side surface of the first base body 23, while the "closed" end does not. In other words, each first fixing groove 21 is a groove that inwardly extends from the side surface of the first base body 23 and does not cut entirely through the first base body 23 along the longitudinal direction of the groove.

Figure 6:
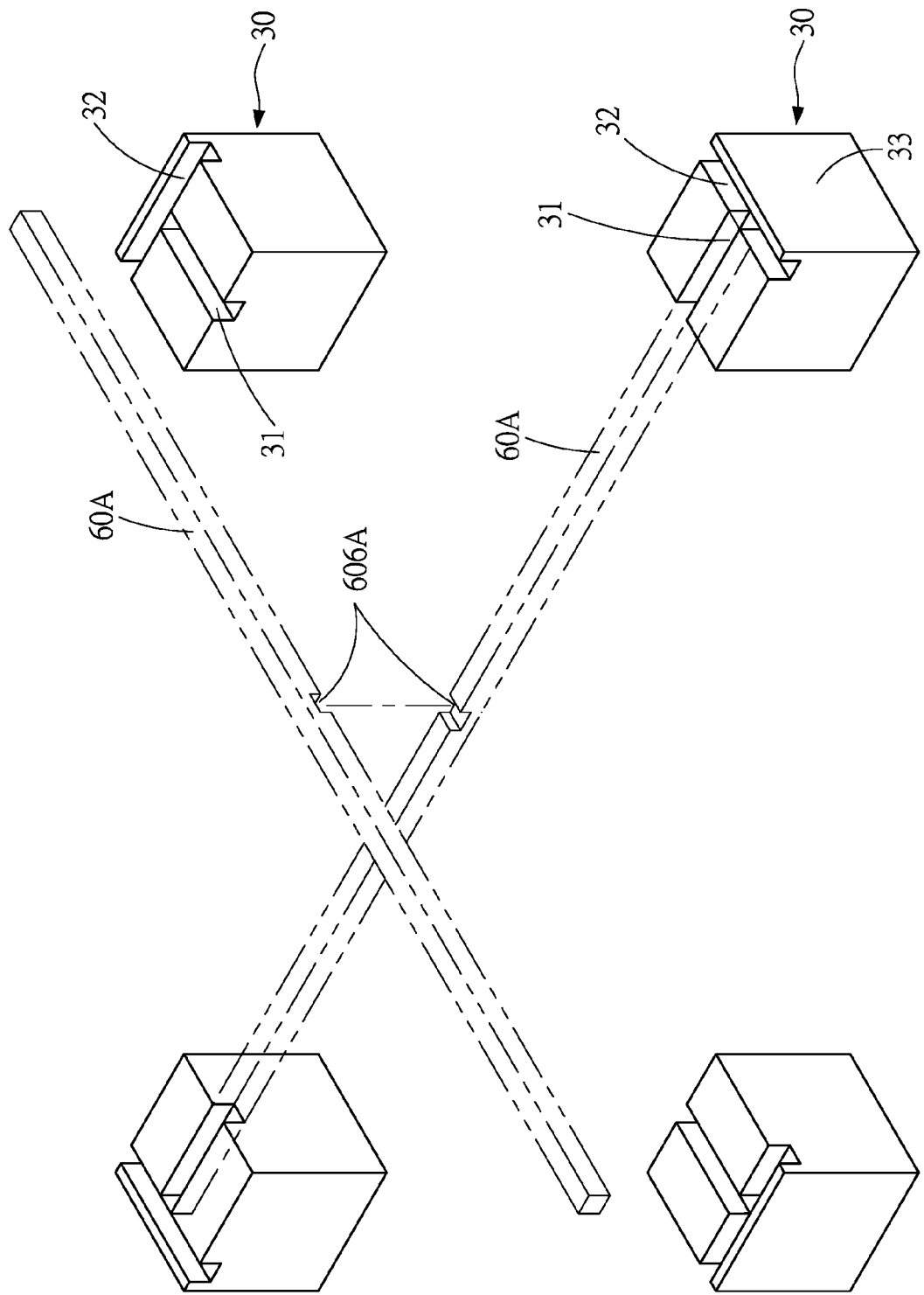
FIG. 6 illustrates a structural schematic view (1) of a second base member of the embodiment according to the instant disclosure.

Please refer to FIG. 2, FIG. 3, and FIG. 6. Each of the first base members 20 is located between two second base members 30, and the first base members 20 are arranged symmetrically about the central base member 10. In this embodiment, the central base member 10 is cubic, the first base members 20 are located nearby the corners of the central base member 10, and the second base members 30 are located nearby the side surfaces of the central base member 10.

Figure 15:
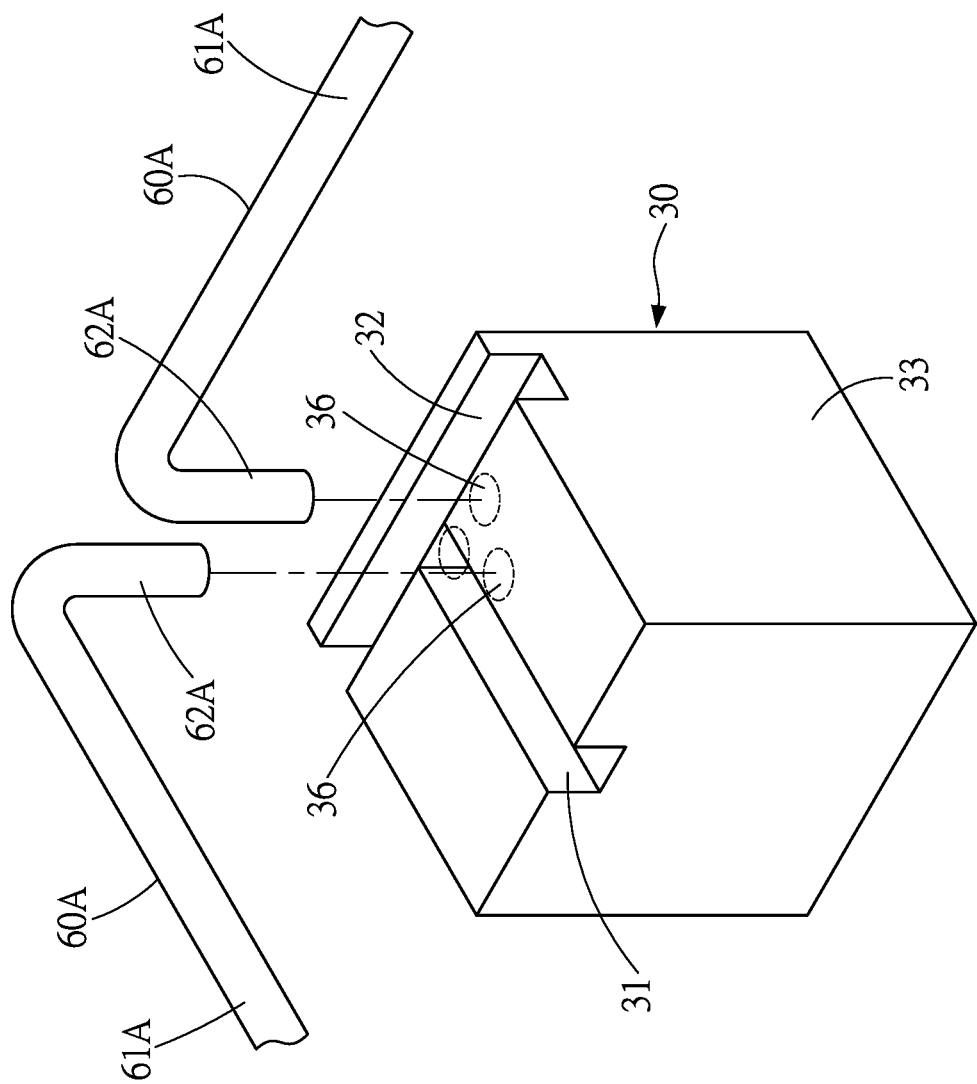
FIG. 15 illustrates a structural schematic view (2) of the second base member of the embodiment according to the instant disclosure.
Figure 16:
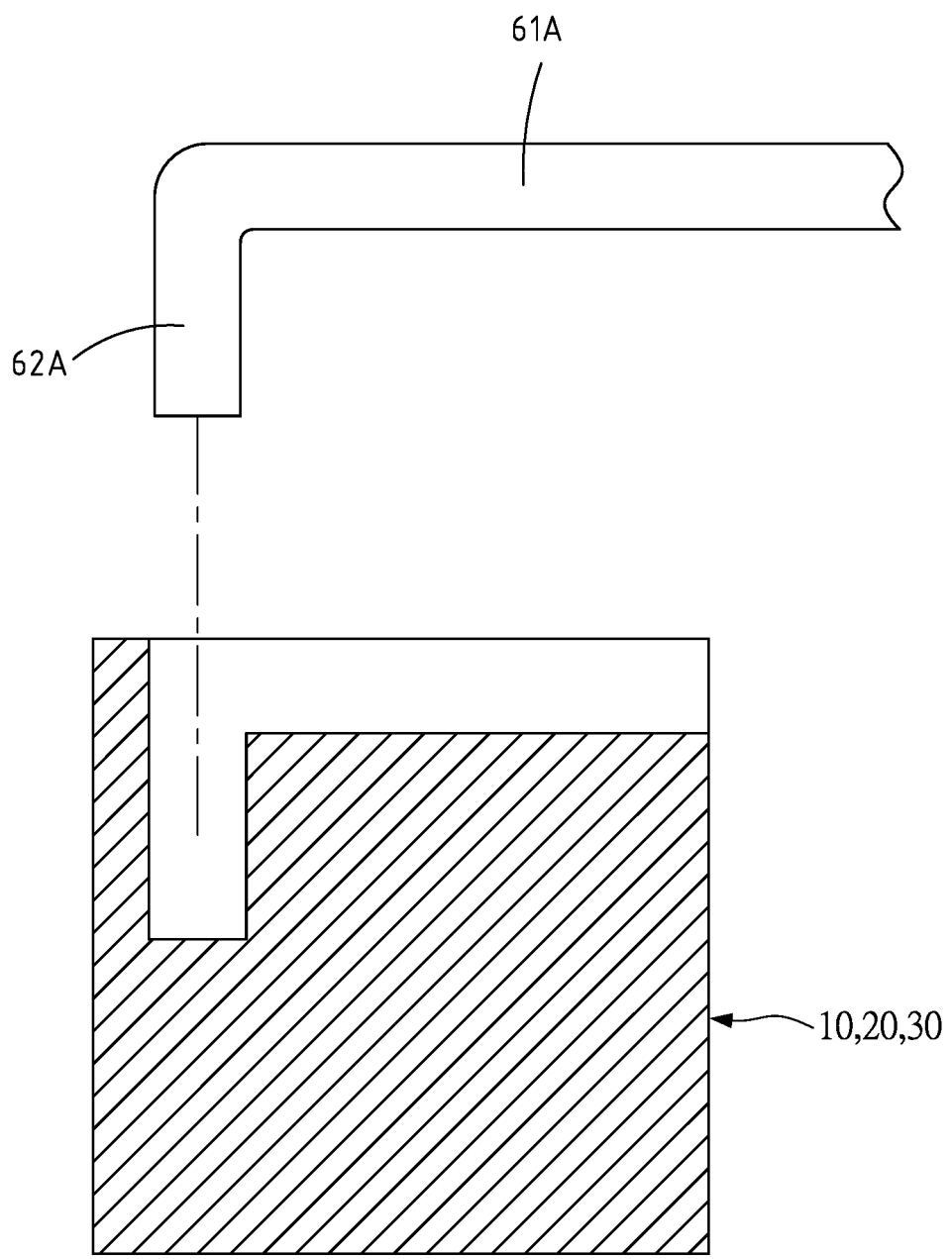
FIG. 16 illustrates an assembled schematic view showing that the connecting bars are assembled with the base members of the embodiment according to the instant disclosure.

Please refer to FIGS. 6 and 15. The second base members 30 are manufactured by plastic extrusion molding. Each of the second base members 30 comprises a second base body 33, a second fixing groove 31, and a second slot 32. The second fixing groove 31 and the second slot 32 are formed on the second base body 33. Furthermore, for each second base member 30, one end of the second fixing groove 31 is in communication with the second slot 32, and the second fixing groove 31 and the second slot 32 are oriented orthogonally. Here, each second fixing groove 31 is a groove that inwardly extends from a side surface of the second base body 33 and does not cut entirely through the second base body 33 along the longitudinal direction of the groove. The second slot 32 cuts entirely through the second base body 33 along the longitudinal direction of the second slot 32.

Furthermore, the first base members 20 and/or the second base members 30 may be polyhedrons, such as cubes (as shown in FIG. 1) or cuboids, and are not limited thereto. For example, a round shape is also possible. In this embodiment, the central base member 10 is located at the center of the pallet frame 1. The first base members 20 are located nearby the corners of the central base member 10, and the second base members 30 are located nearby the side surfaces of the central base member 10. As shown, the base members 10, 20, 30 are formed as a 3×3 matrix structure.

Figure 7:
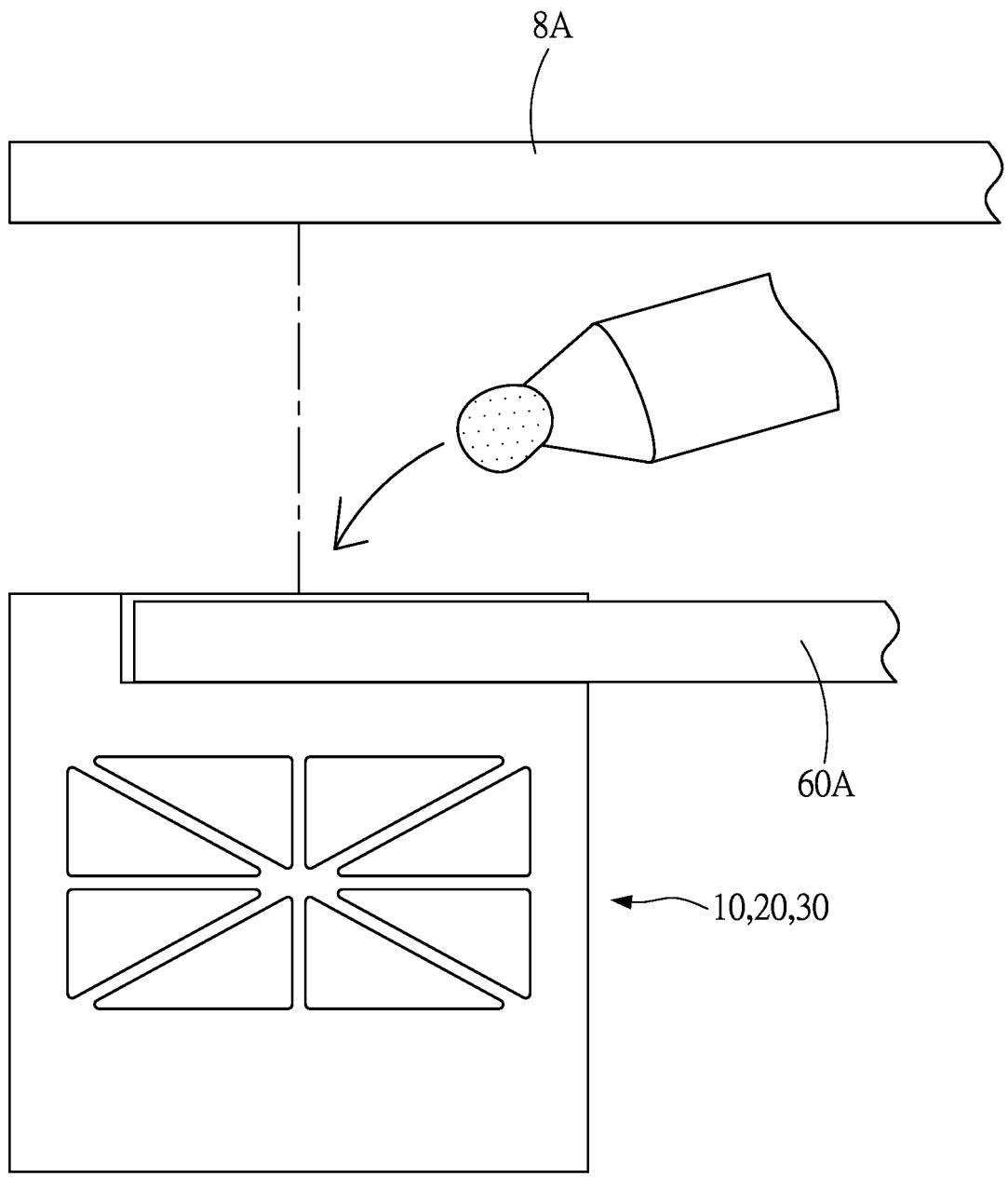
FIG. 7 illustrates an operational schematic view showing that the pallet frame is assembling with the loading plate of the embodiment according to the instant disclosure.

Here, the central base member 10, the first base members 20 and the second base members 30 may be hollowed, so that the base members 10, 20, 30 can be light weighted. In this embodiment, as shown in FIG. 7, the base bodies 13, 23, 33 of the base members 10, 20, 30 have ribbed internal structures, which may be H, I, X shaped, etc. Therefore, along with the weight reduction of the base members 10, 20, 30, the structural strengths of the base members 10, 20, 30 can be improved. Furthermore, each of the base bodies 13, 23, 33 has a first surface and a second surface opposite to the first surface, and the fixing grooves 21, 31 and the slots 11, 32 are formed on respective first surfaces.

Please refer to FIG. 2. The connecting bars 60A are provided to connect and secure the central base member 10, the first base members 20, and the second base members 30.

Here, each of the connecting bars 60A is shaped like an elongated bar, and the diameter of the connecting bar 60A is not greater than the depth of the fixing grooves 21, 31 and/or the depth of the slots 11, 32. Here, the connecting bars 60A are fixedly received in the first fixing grooves 21, the second fixing grooves 31, the second slots 32, and the central slots 11 to secure the central base member 10, the first base members 20, and the second base members 30.

As shown in FIGS. 2, 3, and 5, two ends of each of the side-based connecting bars 60A, i.e., the connecting bars 60A being arranged peripherally, are fixedly received in two first fixing grooves 21 and abutted against the inner walls of the first fixing grooves 21 of two different first base members 20, respectively. Furthermore, the middle portion of each side-based connecting bar 60A is fixedly received in the second slot 32 of one second base member 30. Therefore, three base members, i.e., two first base members 20 and one second base member 30, are connected and secured by one side-based connecting bar 60A. In addition, the inner walls of the first fixing grooves 21 are abutted against the side-based connecting bars 60A, so that the side-based connecting bars 60A are positionally restricted from moving freely relative to the first fixing grooves 21 to keep the base members 20, 30 secured.

As shown in FIGS. 2, 3, and 6, two ends of each of the cross-based connecting bars 60A, i.e., the connecting bars 60A being arranged in a cross-like pattern, are fixedly received in two second fixing grooves 31 of two different second base members 30, respectively. The two ends of each cross-based connecting bar 60A are abutted by the inner walls of the two second fixing grooves 31 of two different second base members 30 or by the side-based connecting bars 60A (i.e., connecting bars 60A whose middle portions are fixedly received in the second slots 32 of the second base members 30). In addition, the middle portion of each cross-based connecting bar 60A is fixedly received in one of the central slots 11 of the central base member 10. Therefore, three base members, i.e., two second base members 30 and the central base member 10 are connected and secured with each other by one cross-based connecting bar 60A, so that the cross-based connecting bars 60A are positionally restricted from moving freely relative to the second fixing grooves 31 to keep the base members 10, 30 secured.

Please refer to FIG. 1. As mentioned in the preceding paragraphs, the central base member 10, the first base members 20, and the second base members 30 are secured by the connecting bars 60A, so that the pallet frame 1 can be assembled. Next, the loading plate 8A is fixed on the pallet frame 1 to complete the pallet 9 according to the instant disclosure. Here, the loading plate 8A may be a unitary member or formed by a plurality of plates, and the loading plate 8A may be a particle board, a paper honeycomb plate, or a composite board. Moreover, the loading plate 8A may be fixed on the pallet frame 1 by means of engaging, mating, gluing, locking, or heat sealing. Based on the above, the pallet 9 can be lifted up by a forklift truck.

Additionally, as shown in FIGS. 8 to 11, and FIG. 13, the central base member 10 of the pallet 9 further comprises a plurality of central angled slots 14 formed on the central base body 13. The central slots 11 and the central angled slots 14 cross at the intersecting point 10A of the central base body 13. Each of the first base members 20 further comprise a first angled fixing groove 24 formed on the first base body 23. One end of the first angled fixing groove 24 is in communication with one end of each of the first fixing grooves 21. The pallet 9 further comprises a plurality of slanted connecting bars 70A fixedly received in the first angled fixing grooves 24 and the central angled slots 14 to secure the central base member 10 and the first base members 20. The slanted connecting bars 70A are positionally restricted by the first angled fixing grooves 24 and the central angled slots 14.

Figure 8:
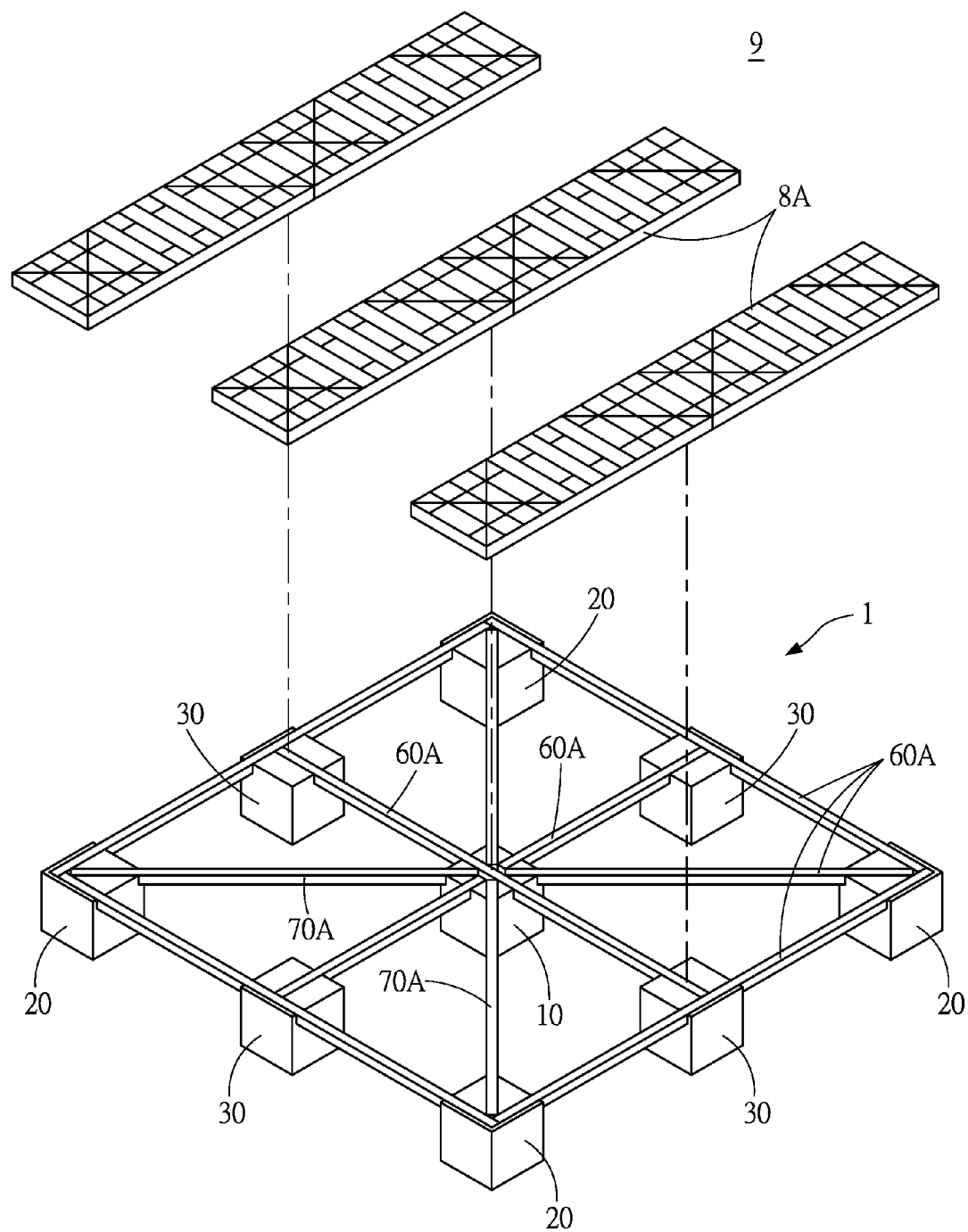
FIG. 8 illustrates a structural schematic view (2) of the pallet of the embodiment according to the instant disclosure.
Figure 9:
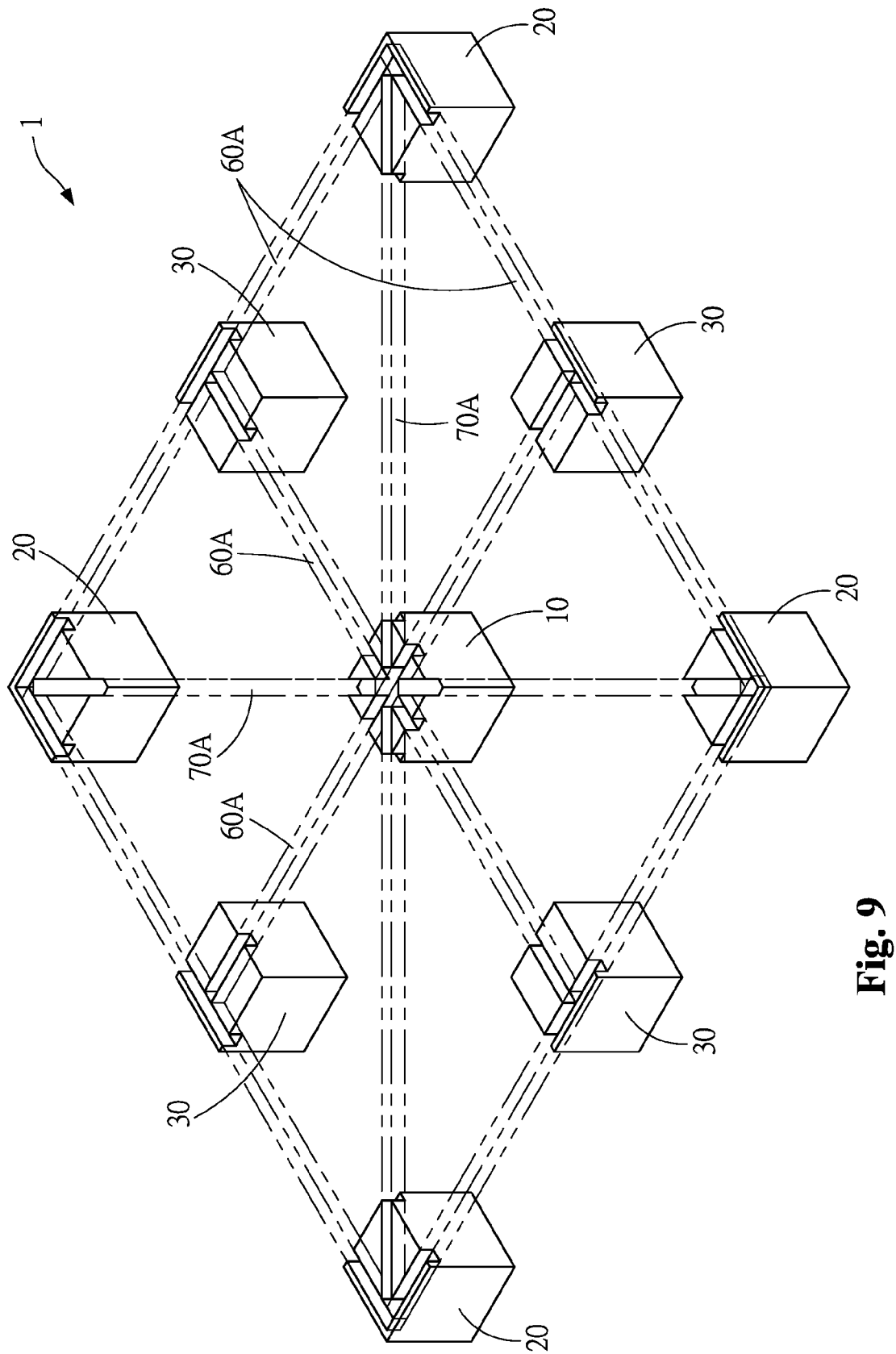
FIG. 9 illustrates a structural schematic view (3) of the pallet frame of the embodiment according to the instant disclosure.
Figure 10:
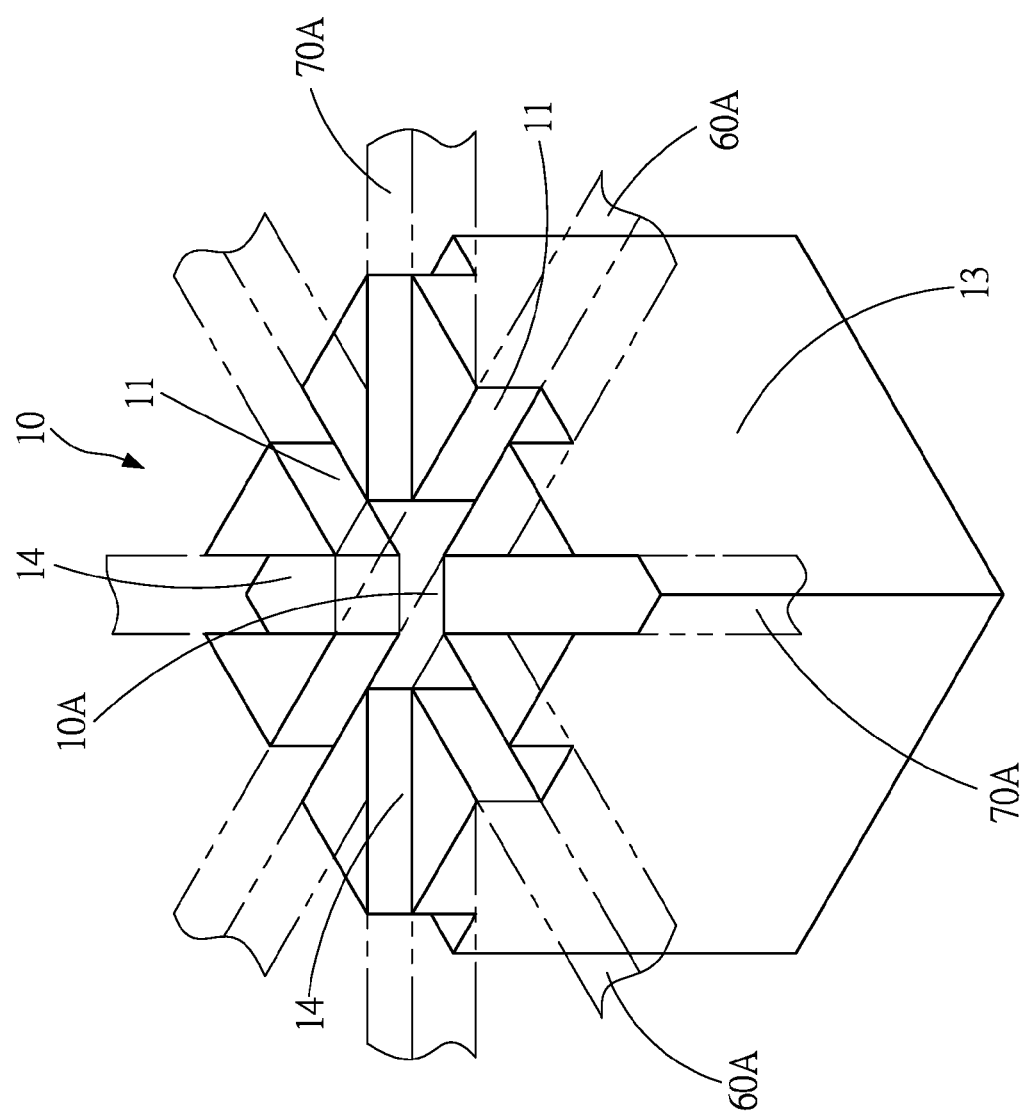
FIG. 10 illustrates a structural schematic view (2) of the central base member of the embodiment according to the instant disclosure.

Please refer to FIGS. 8 to 10. The central slots 11 of the central base member 13 are arranged in a cross-like pattern, and the central angled slots 14 are further arranged with the central slots 11, such that the central slots 11 and the central angled slots 14 form a star-like pattern. Here, the central slots 11 and the central angled slots 14 are cut entirely through the central base body 13 from one side of the central base body 13 to an opposite side of the central base body 13.

Figure 11:
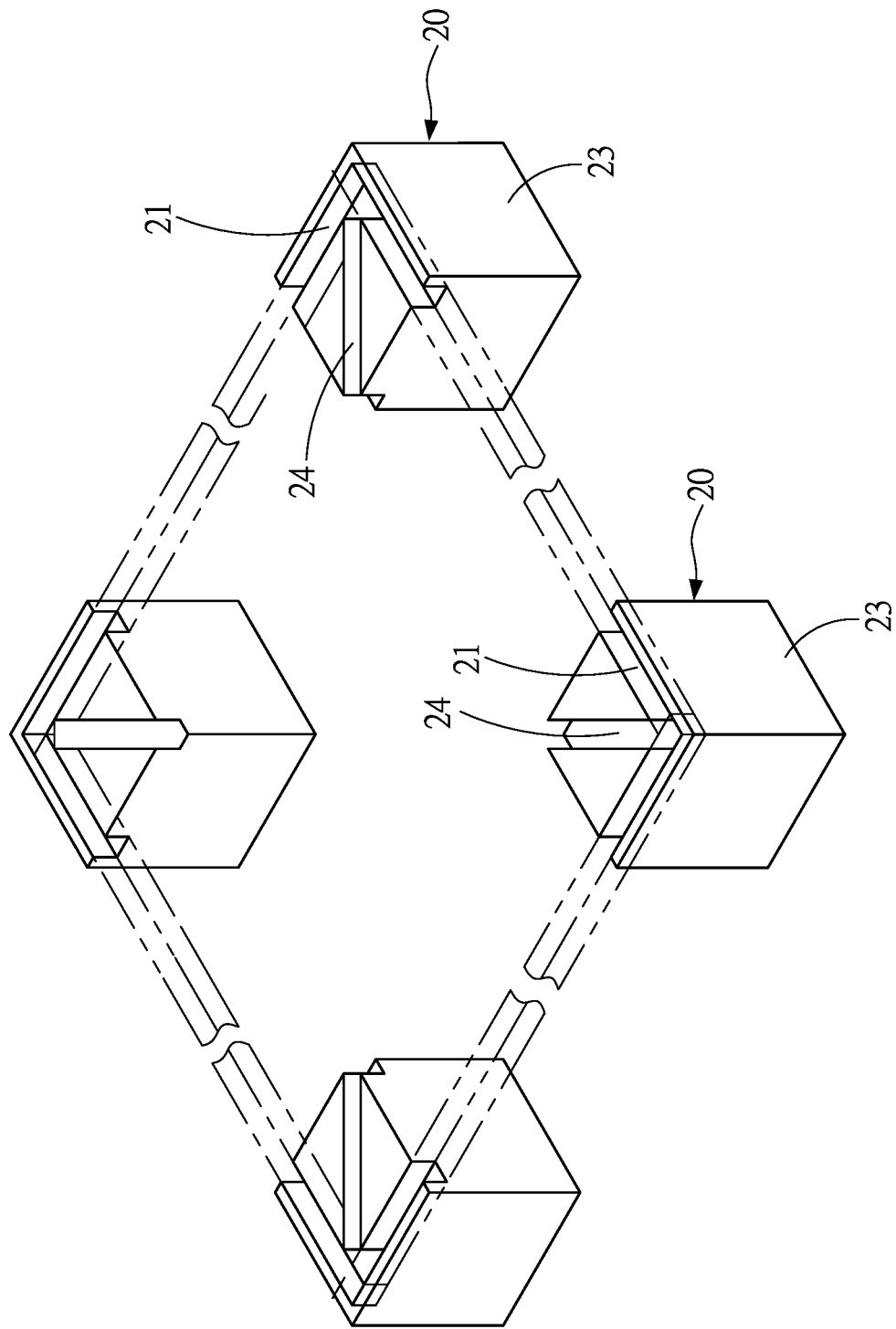
FIG. 11 illustrates a structural schematic view (2) of the first base member of the embodiment according to the instant disclosure.
Figure 14:
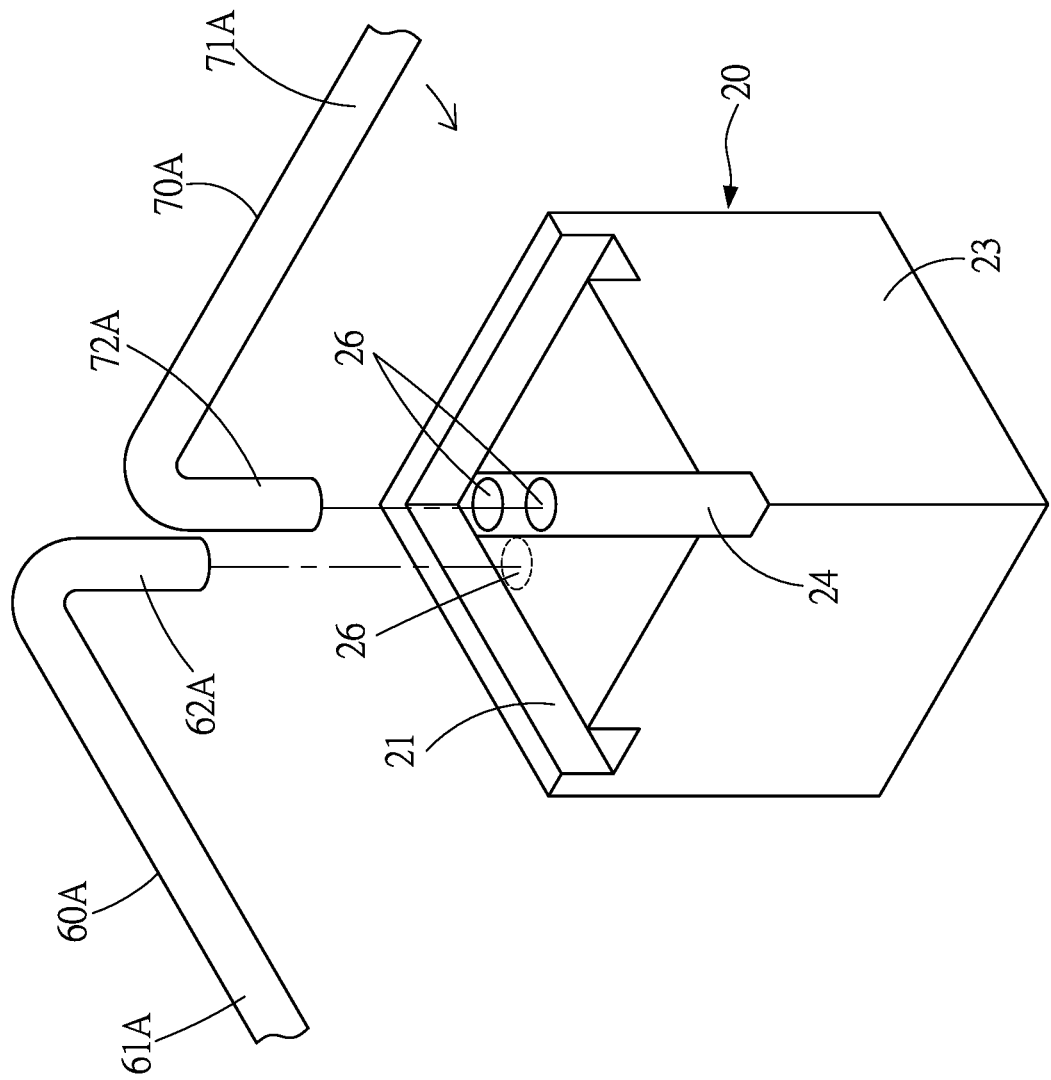
FIG. 14 illustrates a structural schematic view (3) of the first base member of the embodiment according to the instant disclosure.

Please refer to FIGS. 11 and 14. Each of the first base members 20 comprises a first base body 23, a plurality of first fixing grooves 21, and a first angled fixing groove 24. The first angled fixing groove 24 is formed on the first base body 23, and one end of the first angled fixing groove 24 is in communication with the one end of each of the first fixing grooves 21. Furthermore, an angle of approximately 45 degrees is formed between the first angled fixing groove 24 and each of the adjacent first fixing grooves 21. Here, the first fixing grooves 21 and the first angled fixing groove 24 are grooves that inwardly extend from the side surface of the first base body 23 and do not cut entirely through the first base body 23.

In this embodiment, as shown in FIGS. 8 to 11, the base members 10, 20, 30 are polyhedrons. The central base member 10 is located at the center of the pallet frame 1, the first base members 20 are located nearby the corners of the central base member 10, and the second base members 30 are located nearby the side surfaces of the central base member 10. As shown, the base members 10, 20, 30 are formed as a 3×3 matrix structure. Furthermore, each of the central angled slots 14 is aligned with the corresponding first angled fixing groove 24 when the pallet frame 1 is assembled.

Please refer to FIGS. 9 to 15. The connecting bars 60A and the slanted connecting bars 70A are provided to connect and secure the central base member 10, the first base members 20, and the second base members 30. Here, the connecting bars 60A and the slanted connecting bars 70A are shaped like elongated bars, and the diameters of the connecting bars are not greater than respective grooves and/or slots. The connecting bars 60A are fixedly received in the first fixing grooves 21, the second fixing grooves 31, the second slots 32, and the central slots 11 to secure the central base member 10, the first base members 20, and the second base members 30. The slanted connecting bars 70A are fixedly received in the central angled slots 14 and the first angled fixing grooves 24, so that the connections between the first base members 20 and the central base member 10 can be further improved.

Here, for one of the slanted connecting bars 70A, two ends of the slanted connecting bar 70A are fixedly received in the first fixing groove 21 of the corresponding first base member 20 and in one of the central slots 11 of the central base member 10, with one end of the slanted connecting bar 70A abutted against the inner walls of the first fixing groove 21 of the corresponding first base member 20. Consequently, the central base member 10 is connected and secured to one first base member 20 by one slanted connecting bar 70A. In addition, the inner walls of each first fixing groove 21 serve to abut against the corresponding slanted connecting bar 70A, such that each slanted connecting bar 70A is restricted positionally from moving freely relative to the first fixing groove 21 to keep the base members 10 and 20 secured.

In another embodiment, for one of the slanted connecting bars 70A, two ends of the slanted connecting bar 70A are respectively fixedly received in two first fixing grooves 21 of two different first base members 20, and the middle portion of the slanted connecting bar 70A is fixedly received in one of the central slots 11 of the central base member 10. Therefore, the central base member 10 is connected and secured to two first base members 20 by one slanted connecting bar 70. Likewise, the inner walls of the first angled fixing grooves 24 serve to abut against the slanted connecting bars 70A, such that the slanted connecting bars 70A are positionally restricted from moving freely relative to the first fixing grooves 21, so as to keep the base members 10 and 20 secured.

Please refer to FIG. 8. As mentioned in the preceding paragraphs, the central base member 10, the first base members 20, and the second base members 30 are secured by the connecting bars 60A and the slanted connecting bars 70A, so that the pallet frame 1 can be assembled. Next, the loading plate 8A is fixed on the pallet frame 1 to complete the pallet 9 according to the instant disclosure. Here, the loading plate 8A may be a unitary member or formed by a plurality of plates, and the loading plate 8A may be a particle board, a paper honeycomb plate, or a composite board. Moreover, the loading plate 8A may be fixed on the pallet frame 1 by means of engaging, mating, gluing, locking, or heat sealing. Based on the above, the pallet 9 can be lifted up by a forklift truck.

Furthermore, as shown in FIGS. 13 to 16, the central base member 10 further comprises a plurality of central positioning holes 16, and each of the first base members 20 further comprises a plurality of first positioning holes 26. Each of the connecting bars 60A and the slanted connecting bars 70A comprises a main body 61A/71A and a plurality of bending portions 62A/72A. The bending portions 62A/72A extend from respective opposite ends of the main body 61A/71A and are bent toward the same direction. The bending portions 62A/72A may be inserted into the corresponding central positioning holes 16 and the corresponding first poisoning holes 26 to secure the central base member 10 and the first base members 20, respectively.

Figure 13:
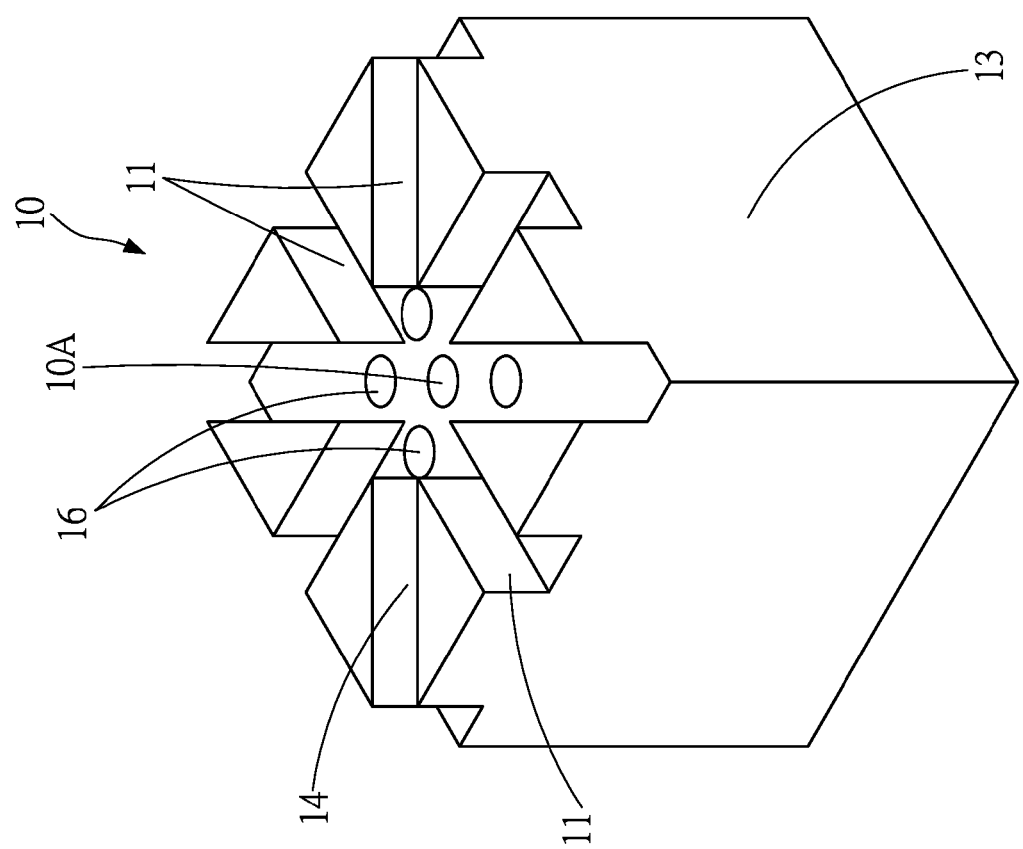
FIG. 13 illustrates a structural schematic view (3) of the central base member of the embodiment according to the instant disclosure.

Please refer to FIGS. 13 and 14. The central positioning holes 16 are formed in the respective central slots 11 and the central angled slots 14, and the depth of each of the central positioning holes 16 is greater than the depth of the corresponding central slot 11 and the depth of the corresponding angled slot 14. The first positioning holes 26 are formed in the first fixing grooves 21 and the first angled fixing groove 24 of each of the first base members 20, and the depth of each of the first positioning holes 26 is greater than the depth of the corresponding first fixing groove 21 and the corresponding first angled fixing groove 24.

Please refer to FIGS. 13 and 14. Each of the slanted connecting bars 70A comprises a main body 71A and a plurality of bending portions 72A formed at two ends of the main body 71A. In general, each of the slanted connecting bars 70A is formed as an elongated U-profile. Furthermore, the diameter of each of the main body 71A is not greater than the depth of the grooves and slots. The bending portions 72A extend from respective opposite ends of the main body 71A and are bent toward the same direction. The bending portions 72A may be inserted into the corresponding central positioning holes 16 and the corresponding first positioning holes 26 to secure the central base member 10 and the first base members 20.

Please refer to FIGS. 8 and 14. As mentioned in the preceding paragraphs, the central base member 10, the first base members 20 and the second base members 30 are secured by the connecting bars 60A or are secured by the connecting bars 60A and the slanted connecting bars 70A, so that the pallet frame 1 can be assembled. Next, the loading plate 8A is fixed on the pallet frame 1 to complete the pallet 9 according to the instant disclosure. Here, the loading plate 8A may be fixed on the pallet frame 1 by means of engaging, mating, gluing, locking, or heat sealing. Based on the above, the pallet 9 can be lifted up by a forklift truck.

Please refer to FIGS. 13 to 17. Each of the connecting bars 60A comprises a main body 61A and a plurality of bending portions 62A formed at two ends of the main body 61A. In general, each of the connecting bars 60A is formed as an elongated U-profile. Furthermore, the diameter of each of the main body 61A is not greater than the depth of the grooves and slots. The bending portions 62A extend from respective opposite ends of the main body 61A and bent toward the same direction. The bending portions 62A may be inserted into the corresponding central positioning holes 16, the corresponding first poisoning holes 26, and the corresponding second positioning holes 36 to secure the central base member 10, the first base members 20, and the second base members 30, respectively.

Here, the bending portions 62A of opposite ends of the main body 61A may be inserted into the first positioning holes 26 of two different first base members 20. Alternatively, the bending portions 62A may be inserted into one of the first positioning holes 26 and one of the second positioning holes 36 to secure the first base member 20 and the second base member 30. In a further option, the bending portions 62A may be inserted into one of the central positioning holes 16 and one of the second positioning holes 36 to secure the central base member 10 and the second base member 30.

Figure 12:
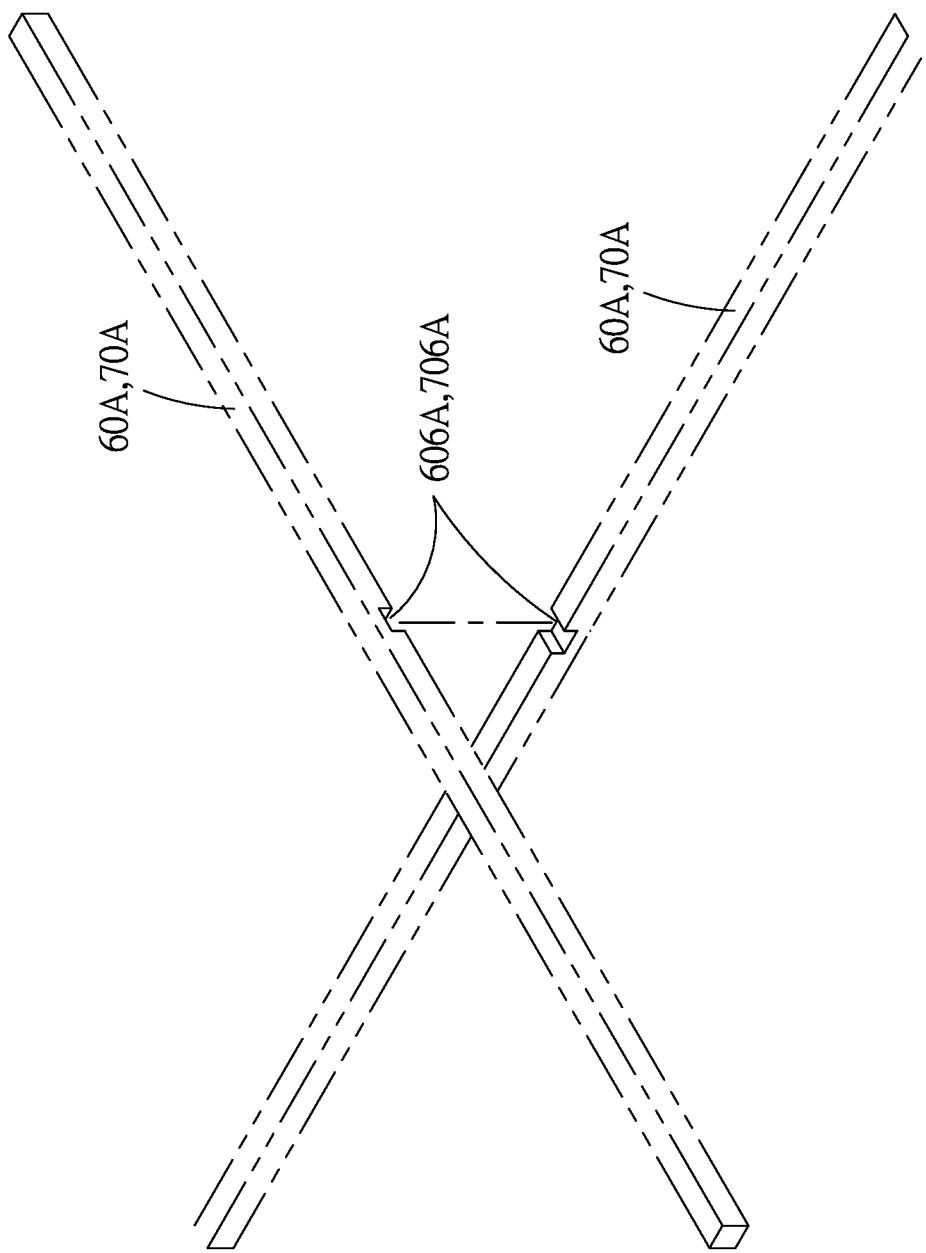
FIG. 12 illustrates a structural schematic view of a connecting bar and an slanted connecting bar of the embodiment according to the instant disclosure.

Please refer to FIG. 12. Each of the connecting bars 60A may further comprise a recess 606A, wherein when two of the connecting bars 60A are in a cross-stacked relationship, the recess 606A of one of the connecting bars 60A is mated with the other connecting bar 60A. Specifically, the first recess 606A of one of the connecting bars 60A may be mated with the recess 606A of the other connecting bar 60A. Alternatively, when one connecting bar 60A and one slanted connecting bar 70A are in a cross-stacked relationship, the recess 606A of the connecting bar 60A is mated with the slanted connecting bar 70A. Each of the slanted connecting bars 70A may further comprise a recess 706A, wherein when two of the slanted connecting bars 70A are in a cross-stacked relationship, the recess 706A of one of the slanted connecting bars 70A is mated with the other slanted connecting bar 70A. Specifically, the recess 706A of one of the slanted connecting bars 70A may be mated with the recess 706A of the other slanted connecting bar 70A. Alternatively, when one connecting bar 60A and one slanted connecting bar 70A are in a cross-stacked relationship, the recess 706A of the slanted connecting bar 70A is mated with the connecting bar 60A.

Please refer to FIGS. 13 to 16. According to another embodiment of the instant disclosure, the central base member 10 further comprises a plurality of central positioning holes 16, each of the first base members 20 further comprises a plurality of first positioning holes 26, and each of the second base members 30 further comprises a plurality of second positioning holes 36. Each of the connecting bars 60A comprises a main body 61A and a plurality of bending portions 62A formed at two ends of the main body 61A. The bending portions 62A extend from respective opposite ends of the main body 61A and are bent toward the same direction. The bending portions 62A may be inserted into the corresponding central positioning holes 16, the corresponding first poisoning holes 26, and the corresponding second positioning holes 36 to secure the central base member 10, the first base members 20, and the second base members 30, respectively.

Please refer to FIGS. 13 to 15. The central positioning holes 16 are formed in the central slots 11, and the depth of each of the central positioning holes 16 is greater than the depth of the corresponding central slot 11. The first positioning holes 26 are formed in the first fixing grooves 21 of each of the first base members 20, and the depth of each of the first positioning holes 26 is greater than the depth of the corresponding first fixing groove 21. The second positioning holes 36 are formed in the second groove 31 of each of the second base members 30, and the depth of each of the second positioning holes 36 is greater than the depth of the second fixing groove 31.

Figure 17:
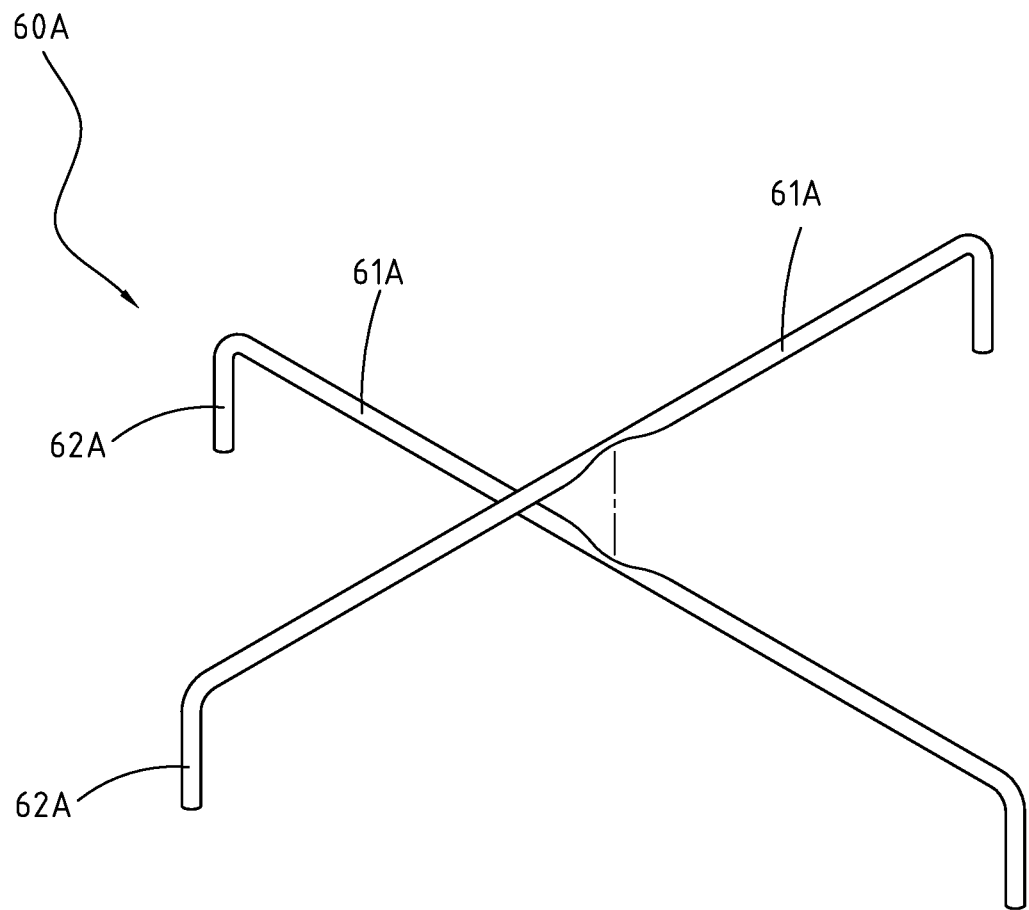
FIG. 17 illustrates a structural schematic view of the connecting bars of the embodiment according to the instant disclosure.

The structure of the connecting bar 60A is as shown in FIG. 17, similar to the aforementioned embodiments, so no further elaboration will be given herein.

As shown in FIG. 6. Each of the connecting bars 60A may further comprise a recess 606A, wherein when two of the connecting bars 60A are in a cross-stacked relationship, the recess 606A of one of the connecting bars 60A is mated with the other connecting bar 60A.

Figure 18:
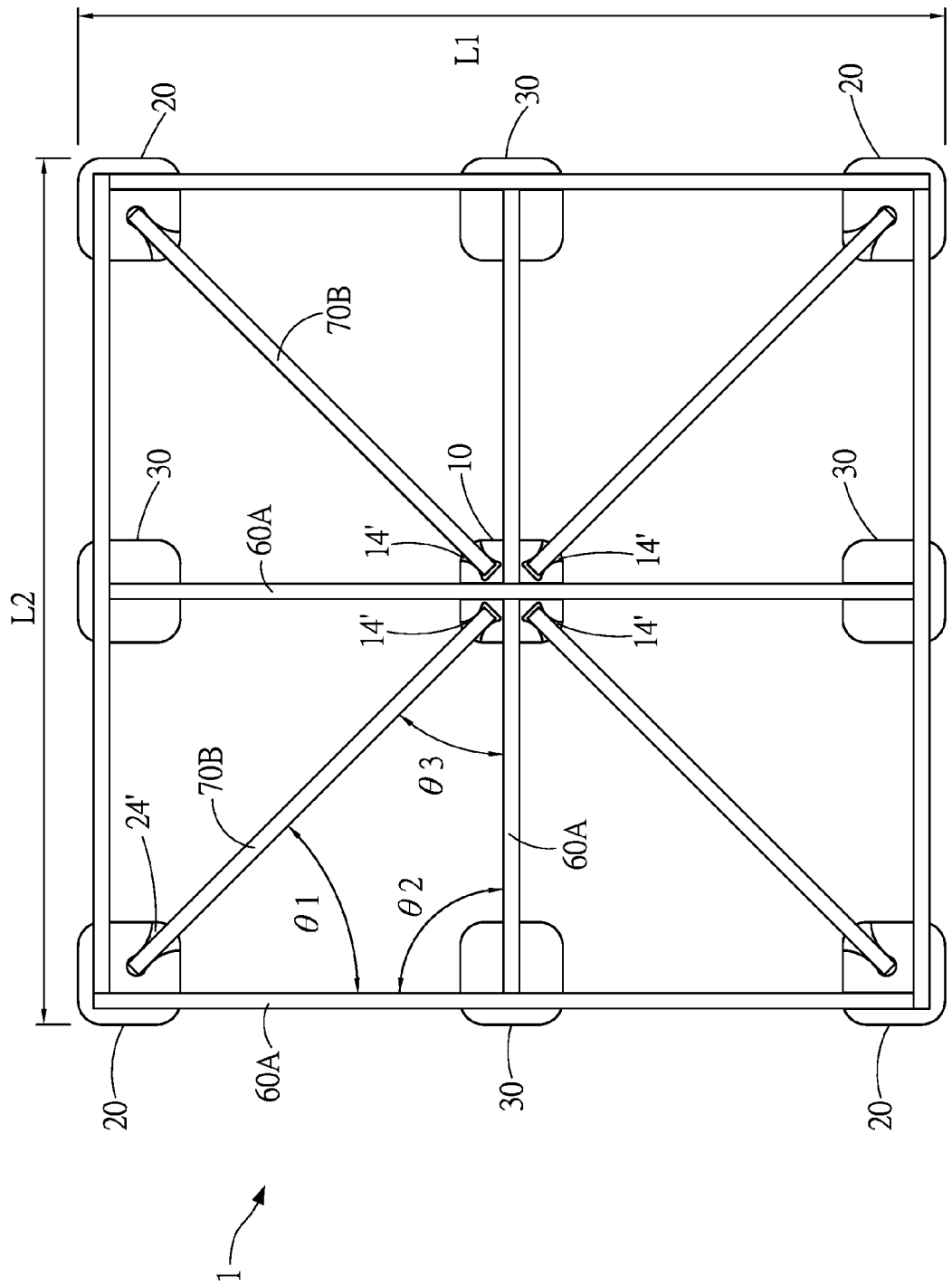
FIG. 18 illustrates a structural schematic view (4-1) of the pallet of the embodiment according to the instant disclosure.
Figure 19:
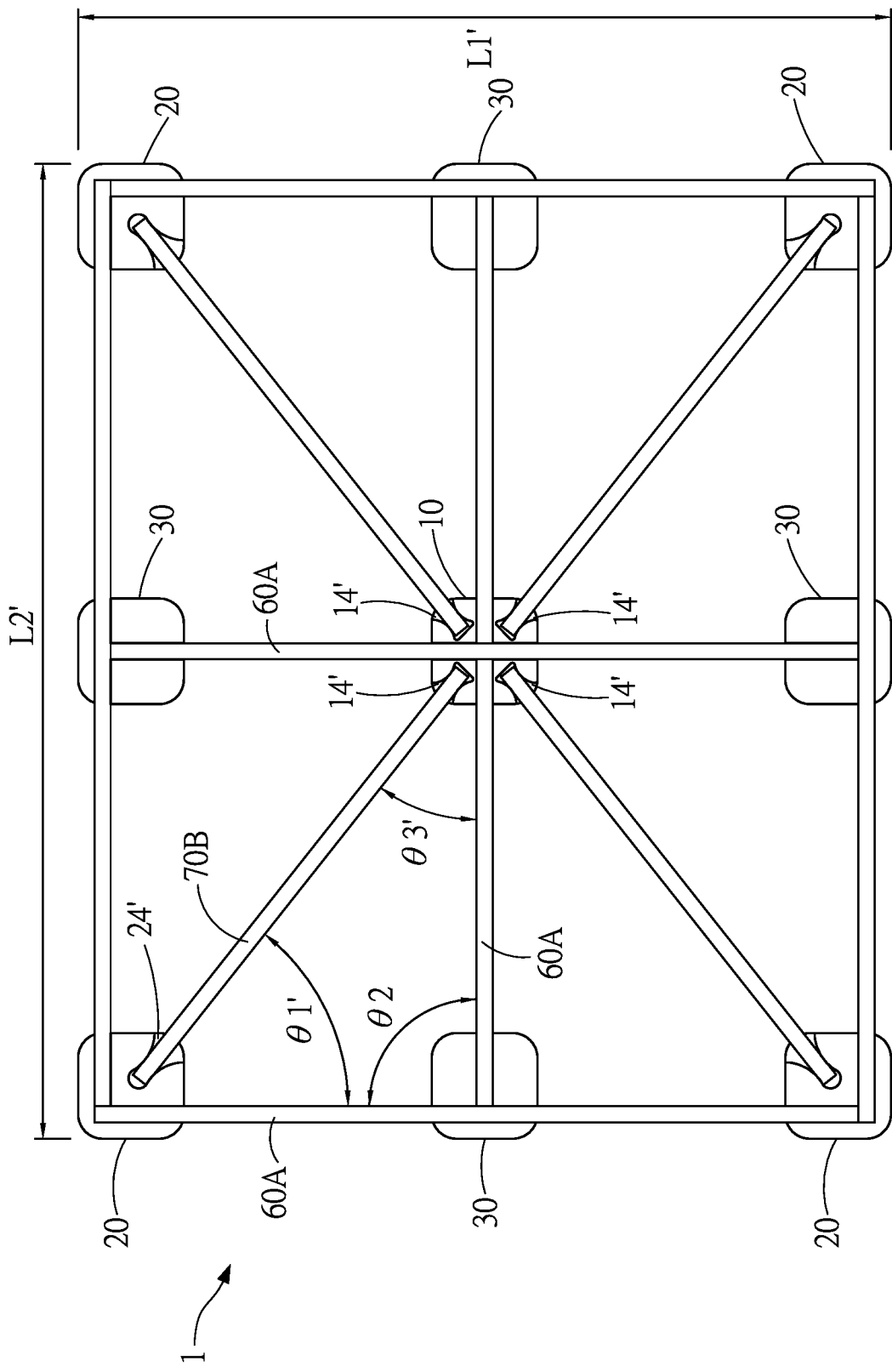
FIG. 19 illustrates a structural schematic view (4-2) of the pallet of the embodiment according to the instant disclosure.
Figure 21:
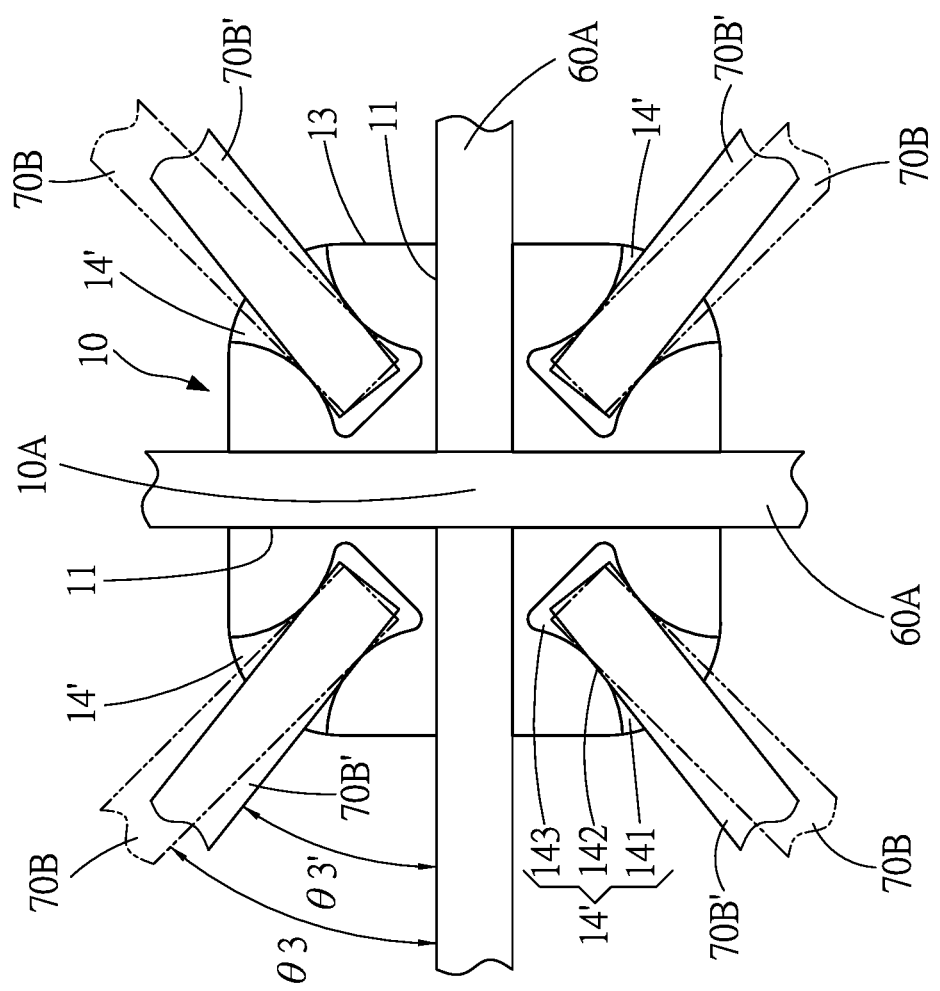
FIG. 21 illustrates a structural schematic view (4) of the central base member of the embodiment according to the instant disclosure.

Please further refer to FIGS. 18, 19, and 21. The central base member 10 further comprises a plurality of central angled slots 14' formed on the central base body 13. Specifically, in this embodiment, the number of the central angled slots 14' is four. The central angled slots 14' are respectively located at four corners of the central base body 13. One end of each of the central angled slots 14' extends toward the intersecting point 10A but not in communication with the central slots 11. In other words, the central angled slots 14' are not in communication with each other. Furthermore, each of the central angled slots 14' comprises, along a direction toward the intersecting point 10A of the central base body 13, a central exterior expanding section 141, a central abutting portion 142, and a central interior expanding section 143. From a top view, each of the central angled slots 14' is of funnel shape (or of gourd shape). In other words, the central abutting portion 142 of each of the central angled slots 14' is the neck portion of the slot, i.e., the width of the central abutting portion 142 is less than the width of the central interior expanding section 143 and the width of the central exterior expanding section 141, and the width of the central interior expanding section 143 is less than the width of the central exterior expanding section 141.

Figure 20:
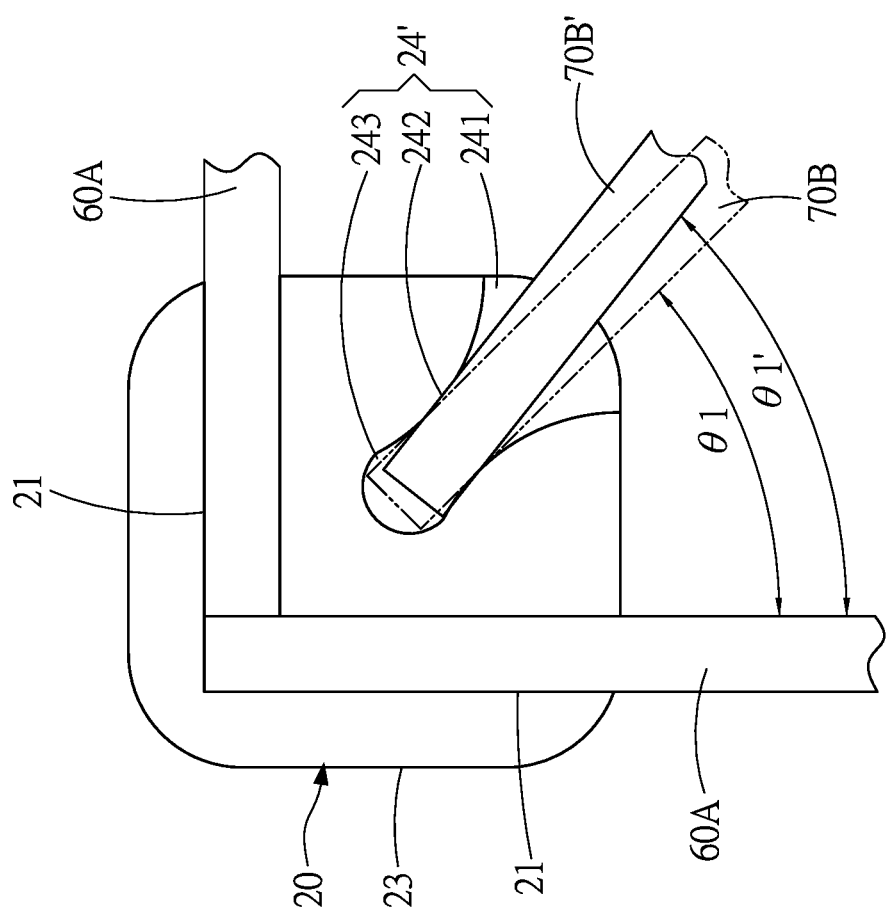
FIG. 20 illustrates a structural schematic view (4) of the first base member of the embodiment according to the instant disclosure.

As shown in FIGS. 18 to 20, the first base member 20 further comprises a first angled fixing groove 24' formed on the first base body 23. One end of the first angled fixing groove 24' extends from the connection between the first fixing grooves 21. The first angled fixing groove 24' of each of the first base members 20 comprises, along a direction toward the connection between the first fixing grooves 21 of the first base member 20, a first exterior expanding section 241, a first abutting portion 242, and a first interior expanding section 243. From a top view, each of the first angled fixing grooves 24' is of funnel shape (or of gourd shape). In other words, the first abutting portion 242 of each of the first angled fixing grooves 24' is the neck portion of the groove, i.e., the width of the first abutting portion 242 is less than the width of the first interior expanding section 243 and the width of the first exterior expanding section 241, and the width of the first interior expanding section 243 is less than the width of the first exterior expanding section 241.

As shown in FIGS. 18 to 21, the pallet 9 further comprises a plurality of slanted connecting bars, indicated by 70B and 70B', respectively. The slanted connecting bars 70B, 70B' are fixedly received in the first angled fixing grooves 24' and the central angled slots 14' to secure the central base member 10 and the first base members 20. Also, the slanted connecting bars 70B, 70B' are positionally restricted by the first angled fixing grooves 24' and the central angled slots 14'. In other words, two ends of the slanted connecting bar 70B, 70B' are respectively located at the first interior expanding section 243 and the central interior expanding section 143 to secure the central base member 10 and the first base members 20.

It is understood that, the size of the pallet 9 can be adjusted, and the structures of the first angled fixing grooves 24' as well as the central angled slots 14' allow the angles between each of the slanted connecting bars 70B, 70B' and the two adjacent connecting bars 60A to be different. For example, as shown in FIGS. 18, 20, and 21, when the length L1 of the pallet 9, i.e., the distance between opposite outer side surfaces of two first base members 20 along the vertical direction, is 1100 cm (centimeter) and the width L2 of the pallet 9, i.e., the distance between opposite outer side surfaces of two first base members 20 along the horizontal direction, is 1100 cm (centimeter), the angles between each of the slanted connecting bars 70B and the adjacent two connecting bars 60A are respectively 45 degrees ($\theta$1), 90 degrees ($\theta$2), and 45 degrees ($\theta$3). Hence, the two ends of each of the slanted connecting bars 70B are respectively abut against the first abutting portion 242 of the corresponding first base member 20 and the corresponding central abutting portion 142 of the central base member 10. As shown in FIGS. 19 to 21, when the length L1' of the pallet 9, i.e., the distance between opposite outer side surfaces of two first base members 20 along the vertical direction, is 1000 cm and the width L2' of the pallet 9, i.e., the distance between opposite outer side surfaces of two first base members 20 along the horizontal direction, is 1200 cm, the angles between each of the slanted connecting bars 70B and the adjacent two connecting bars 60A are respectively 52 degrees ($\theta$1'), 90 degrees ($\theta$2), and 38 degrees ($\theta$3'). Although the angles ($\theta$1, $\theta$3) of the pallet 9 shown in FIG. 18 is different from the angles ($\theta$1', $\theta$3') of the pallet 9 shown in FIG. 19, the two ends of each of the slanted connecting bars 70B can be abutted against the first abutting portion 242 of the corresponding first base member 20 and the corresponding central abutting portion 142 of the central base member 10. In other words, because of the structures of the central exterior expanding section 141, the central interior expanding sections 143, the main exterior expanding section 241, and the main interior expanding section 243, after the angles between the connecting bars 60A and the slanted connecting bars 70B are changed, one of two ends of each of the slanted connecting bars 70B is still abutted against the corresponding central abutting portion 142 of the central base member 10, and the other end of the slanted connecting bar 70B is still abutted against the first abutting portion 242 of the corresponding first base member 20.

In the foregoing embodiments, to allow the pallet 9 to have different sizes, the angle $\theta$1 and the angle $\theta$1' are respectively 45 degrees and 52 degrees, but embodiments are not limited thereto. In some embodiments, the length (L1, L1') and the width (L2, L2') of the pallet 9 may be changed. For example, when the length of the pallet 9 is 1100 cm and the width of the pallet 9 is 1200 cm, the angles between the each of the slanted connecting bars 70B and the adjacent two connecting bars 60A are respectively 48 degrees (θ1), 90 degrees (θ2), and 42 degrees (θ3). In another example, when the length is 1000 cm and the width is 1100 cm, the angles between the each of the slanted connecting bars 70B and the adjacent two connecting bars 60A are respectively 49 degrees (θ1), 90 degrees (θ2), and 41 degrees (θ3). In the forgoing two examples, the angles θ1 are 48 degrees and 49 degrees which are within the interval between 45 degrees and 52 degrees. Hence, in the forgoing two examples, the two ends of each of the slanted connecting bars 70B are respectively abutted against the corresponding first abutting portion 242 and the corresponding central abutting portion 142. In addition, the angles between the two ends of each of the slanted connecting bars 70B and the corresponding central exterior expanding section 141, the corresponding central interior expanding section 143, the corresponding first exterior expanding section 241, and the corresponding first interior expanding section 243 can be changed. Therefore, the structures of the central angled slots 14' and the first angled fixing grooves 24' allow the angles between each of the slanted connecting bars 70B and the two adjacent connecting bars 60A to be different.

The advantages of the pallet according to the instant disclosure are described as below. The first base member and the second base member can be secured with each other by the connecting bar with different lengths, such that the distance there between can be adjusted to allow length and/or width adjustment of the pallet. Therefore, the size of the pallet can be adjusted freely and conveniently. Furthermore, two ends of each of the connecting bars are abutted against the inner walls of the corresponding first or second fixing groove, such that the connecting bars can be prevented from moving freely relative to the fixing grooves or falling off the base members.

In addition, when one of the base members of the pallet is damaged or missing, the damaged base member or the missing base member can be replaced by a new base member. Therefore, the pallet according to the instant disclosure can be used twice or for more times, allowing the cost reduction in manufactory. Further, since the internal frame of the base body is H I, or X shaped, along with weight reduction of the base members, the structural strength of the base members can be improved. Furthermore, the base members and the connecting bars are connected with each other to form the pallet frame which is rigid and has high structural strength, such that the pallet frame would not deform and is safe when used for handling and transporting materials.

Besides, the bending portions of the connecting bars can be inserted into different positioning holes of the base members, such that the distance between two base members can be adjusted to allow length and/or width adjustment of the pallet.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A pallet, comprising:
    a plurality of first base members, each of the first base members comprising a first base body, a plurality of first fixing grooves formed on the first base body, and a first angled fixing groove formed on the first base body, wherein the first fixing grooves of each of the first base members are in communication with each other, the first fixing grooves of each of the first base members are oriented orthogonally, and one end of the first angled fixing groove intersects with one end of each of the first fixing grooves;
    a plurality of second base members, each of the second base members located between the corresponding two first base members, wherein each of the second base members comprises a second base body, a second fixing groove formed on the second base body, and a second slot formed on the second base body, wherein one end of the second fixing groove is in communication with the second slot, and the second fixing groove and the second slot of each of the second base members are oriented orthogonally;
    a central base member, located between the second base members, wherein the central base member comprises a central base body, a plurality of central slots formed on the central base body, and a plurality of central angled slots formed on the central base body, wherein the central slots are intersected at an intersecting point of the central base body, and the central slots and the central angled slots cross at an intersecting point of the central base body;
    a plurality of connecting bars, fixedly received in the first fixing grooves, the second fixing grooves, the second slots, and the central slots to secure the central base member, the first base members, and the second base members to form a pallet frame, wherein two ends of each of the connecting bars are abutted against respective inner walls of the first fixing grooves or respective inner walls of the second fixing grooves, so that the connecting bars are positionally restricted by the first fixing grooves, the second fixing grooves, and the central slots;
    a plurality of slanted connecting bars, fixedly received in the first angled fixing grooves and the central angled slots to secure the central base member and the first base members, wherein the slanted connecting bars are positionally restricted by the first angled fixing grooves and the central angled slots; and
    a loading plate, fixed on the pallet frame.

2. The pallet according to claim 1, wherein the central base member further comprises a plurality of central positioning holes formed in the central angled slots, each of the first base members further comprises a first positioning holes formed in the first angled fixing groove, and each of the slanted connecting bars comprise a main body and a plurality of bending portions, the bending portions extend from respective opposite ends of the main body and bent toward the same direction, the bending portions are inserted into the corresponding central positioning holes and the corresponding first positioning holes to secure the central base member and the first base members.

3. The pallet according to claim 2, wherein the depth of each of the central positioning holes is greater than the depth of the corresponding central angled slot, and the depth of each of the first positioning holes is greater than the depth of the corresponding first angled fixing groove.

4. The pallet according to claim 1, wherein the central base member further comprises a plurality of central positioning holes formed in the central slots, each of the first base members further comprises a plurality of first positioning holes formed in the first fixing grooves, and each of the connecting bars comprise a main body and a plurality of bending portions, the bending portions extend from respective opposite ends of the main body and bent toward the same direction, the bending portions are inserted into the corresponding central positioning holes and the corresponding first positioning holes to secure the central base member and the first base members.

5. The pallet according to claim 4, wherein the depth of each of the central positioning holes is greater than the depth of the corresponding central slot, and the depth of each of the first positioning holes is greater than the depth of the corresponding first fixing groove.

6. The pallet according to claim 4, wherein the central base member further comprises a plurality of central positioning holes formed in the central slots, each of the second base members further comprises a plurality of second positioning holes formed in the second slot and the second fixing groove, and each of the connecting bars comprises a main body and a plurality of bending portions extending from respective opposite ends of the main body and bent toward the same direction, the bending portions are inserted into the corresponding central positioning holes, the corresponding first positioning holes, and the corresponding second positioning holes to secure the central base member, the first base members, and the second base members.

7. The pallet according to claim 6, wherein the depth of each of the second positioning holes is greater than the depth of the second fixing groove or the second slot.

8. The pallet according to claim 1, wherein the loading plate is fixed on the pallet frame by means of gluing, heat sealing or locking.

9. The pallet according to claim 1, wherein each of the first base members comprises a limiting surface formed at the connection between the first fixing grooves for restricting the connecting bars.

10. The pallet according to claim 1, wherein each of the central angled slots is aligned with the corresponding first angled fixing groove after the pallet frame is assembled.

11. The pallet according to claim 1, wherein the first recess of one of the connecting bars is mated with the other connecting bar when two of the connecting bars are in a cross-stacked relationship, or the first recess of one of the connecting bars is mated with one slanted connecting bar when the connecting bar and the slanted connecting bar are in a cross-stacked relationship; each of the slanted connecting bars comprises a second recess, the second recess of one of the slanted connecting bars is mated with the other slanted connecting bar when two of the slanted connecting bars are in a cross-stacked relationship, or the second recess of one of the slanted connecting bars is mated with one connecting bar when the slanted connecting bar and the connecting bar are in a cross-stacked relationship.

* * * * *